(12) United States Patent
Kaushik et al.

(10) Patent No.: US 12,523,590 B1
(45) Date of Patent: Jan. 13, 2026

(54) SENSING PLASTICS WITH ELECTRODE SENSOR TO MONITOR FLUID ENVIRONMENTS

(71) Applicant: Florida Polytechnic University, Lakeland, FL (US)

(72) Inventors: Ajeet K. Kaushik, Lakeland, FL (US); Justin Sanchez Almirola, Lakeland, FL (US)

(73) Assignee: Florida Polytechnic University, Lakeland, FL (US)

( * ) Notice: Subject to any disclaimer, the term of this patent is extended or adjusted under 35 U.S.C. 154(b) by 0 days.

(21) Appl. No.: 18/978,926

(22) Filed: Dec. 12, 2024

(51) Int. Cl.
*G01N 15/1031* (2024.01)
*G01N 15/00* (2024.01)
*G01N 15/10* (2024.01)
*G01N 33/42* (2006.01)

(52) U.S. Cl.
CPC . *G01N 15/1031* (2013.01); *G01N 2015/0053* (2013.01); *G01N 2015/1024* (2024.01); *G01N 33/42* (2013.01)

(58) Field of Classification Search
CPC .............. G01N 15/1031; G01N 33/42; G01N 2015/0053; G01N 2015/1024
USPC ........................................................ 324/71.4
See application file for complete search history.

(56) References Cited

U.S. PATENT DOCUMENTS

| | | | | |
|---|---|---|---|---|
| 2,825,872 A * | 3/1958 | Stubbs | ............... | G01N 15/1031 73/28.01 |
| 5,302,274 A * | 4/1994 | Tomantschger | ... | G01N 27/4045 204/426 |
| 6,577,112 B2 * | 6/2003 | Lvovich | ............. | G01N 33/2888 73/61.43 |
| 10,241,024 B1 * | 3/2019 | Mavliev | ................. | G01N 21/05 |
| 2007/0010974 A1 * | 1/2007 | Nicoli | ................ | G01N 15/0205 702/196 |

(Continued)

OTHER PUBLICATIONS

Paimard, Giti, Ehsan Ghasali, and Mireia Baeza. "Screen-printed electrodes: Fabrication, modification, and biosensing applications." Chemosensors 11.2 (2023): 113. (Year: 2023).*

(Continued)

*Primary Examiner* — Christopher P McAndrew
(74) *Attorney, Agent, or Firm* — Andrew Behrens; Trenam Law

(57) ABSTRACT

The invention relates to a novel sensor system and method for detecting microplastics and nanoplastics in fluid environments with high sensitivity and specificity. The system comprises a screen-printed carbon electrode coated with a molecularly imprinted polymer layer, designed to selectively bind target plastics. An electrochemical control unit, such as a potentiostat, transmits currents to the electrode, inducing a measurable electrochemical response. The MIP layer features cavities tailored to the shape and size of specific plastics, enhancing selectivity. The sensor detects plastics across a wide concentration range and particle sizes, utilizing techniques like cyclic voltammetry and differential pulse voltammetry. The system supports wireless data acquisition and is adaptable for use in real-time monitoring in various environments. The sensor system can be configured to support multiple sensors in order to quantify concentrations of different plastic types and sizes.

29 Claims, 44 Drawing Sheets
(37 of 44 Drawing Sheet(s) Filed in Color)

(56) References Cited

U.S. PATENT DOCUMENTS

| | | | | |
|---|---|---|---|---|
| 2009/0293580 | A1* | 12/2009 | Babel | G01D 18/00 |
| | | | | 73/1.01 |
| 2010/0283450 | A1* | 11/2010 | Golder | G01N 15/0205 |
| | | | | 324/96 |
| 2011/0269648 | A1* | 11/2011 | Schwartz | G01N 33/5438 |
| | | | | 204/406 |
| 2014/0004618 | A1* | 1/2014 | Chien | G01N 1/24 |
| | | | | 436/151 |
| 2019/0277801 | A1* | 9/2019 | Pratt | G01N 27/413 |
| 2020/0041444 | A1* | 2/2020 | Wong | G16B 30/00 |
| 2024/0295524 | A1* | 9/2024 | Wang | G01N 27/3335 |

OTHER PUBLICATIONS

Cheemalapati, Srikanth, Selvakumar Palanisamy, and Shen-Ming Chen. "Electrochemical determination of hydralazine hydrochloride by preanodised screen printed carbon electrode." International Journal of Electrochemical Science 7.11 (2012): 11488-11496. (Year: 2012).*

Huang, Chen-Ji, et al. "Measurement of low concentration of micro-plastics by detection of bioaffinity-induced particle retention using surface plasmon resonance biosensors." Biosensors 11.7 (2021): 219. (Year: 2021).*

Jebril, Siwar, et al. "Nanomaterial-based electrochemical chemo (bio) sensors for the detection of nanoplastic residues: trends and future prospects." RSC Sustainability 2.4 (2024): 832-851. (Year: 2024).*

J.R Bermudez et al. "A microplastic size classification scheme aligned with universal plankton survey methods" 2021. pp. 1-6. MethodsX United States.

Ajeet Kaushik et al. "Nano/micro-plastic, an invisible threat getting into the brain" 2024. 361. pp. 1-12 Chemosphere. Sønderborg, Denmark.

Justin Sanchez-Almirola et al. "Label and bio-active free electrochemical detection of testosterone hormone using MIP-based sensing platform" 2023. pp. 1-7. 296. Materials Science & Engineering B. Miami, FL.

Ajeet Kaushik et al. "Nano/micro-plastic, an invisible threat getting into the brain" 2024. pp. 1-12. vol. 361 Chemosphere. Tampa, FL.

Ashab Noumani et al. "Electrochemically microplastic detection using chitosan-magnesium oxide nanosheet" 2024. pp. 1-12. vol. 252. Environmental Research. Uttarakhand, India.

J.R. Bermúdez et al. "A microplastic size classification scheme aligned with universal plankton survey methods" 2021. pp. 1-6. MethodsX. Santa Cruz, United States.

Anthony L. Andrady "The plastic in microplastics: A review" 2017. pp. 12-22. vol. 119 Marine Pollution Bulletin. United States.

Katerina Novotna et al. "Microplastics in drinking water treatment—Current knowledge and research needs" 2019. pp. 730-740. vol. 667 Science of the Total Environment. Czech Republic.

Maocai Shen et al. "Presence of microplastics in drinking water from freshwater sources: the investigation in Changsha, China" 2021. pp. 1.Environmental Science and Pollution Research.People's Republic of China.

Luís Gabriel Antão Barboza et al. "Microplastics in the marine environment: Current trends and future perspectives" 2015. pp. 5-12. Marine Pollution Bulletin. Paraná, Brazil.

H.S. Auta et al. "Distribution and importance ofmicroplastics in themarine environment: A review of the sources, fate, effects, and potential solutions" 2017. pp. 165-176. Environment International. Minna, Nigeria.

Gabriel Enrique De-la-Torre "Microplastics: an emerging threat to food security and human health" Oct. 2019. pp. 1-8. Lima, Peru.

Antonio Ragusa et al. "Plasticenta: First evidence of microplastics in human placenta" 2021. pp. 1-8. vol. 146. Environment International. Pavia, Italy.

Luís Fernando Amato-Lourenço et al. "Presence of airborne microplastics in human lung tissue" 2021. pp. 1-6. vol. 416. Journal of Hazardous Materials. Paulo, Brazil.

Sophie V. L. Leonard et al. "Microplastics in human blood: Polymer types, concentrations and characterisation using μFTIR" 2024. pp. 1-9. vol. 188 Environment International. United Kingdom.

Gabor Bordos et al. "Identification of microplastics in fish ponds and natural freshwater environments of the Carpathian basin, Europe" 2019. pp. 110-116. vol. 216. Chemosphere. Hungary.

Cole Lynwood. "Polystyrene Synthesis, Characteristics and Applications" 2014 pp. 1-320. Nova Science Publishers. New York.

Xochitl Quecholac-Piña et al. "Degradation of Plastics under Anaerobic Conditions: A Short Review" 2020. pp. 1-18. vol. 12. Polymers. Reynosa Tamaulipas, Azcapotzalco.

Steve A. Carr et al. "Transport and fate of microplastic particles in wastewater treatment plants" 2016 pp. 174-182. vol. 91 Water Research. South Workman Mill Road, Whittier.

Fionn Murphy et al. "Wastewater Treatment Works (WwTW) as a Source of Microplastics in the Aquatic Environment" 2016. pp. 1-9. Environmental Science & Technology. Scotland.

Michaela E. Miller et al. "Bioaccumulation and biomagnification of microplastics in marine organisms: A review and meta-analysis of current data" 2020. pp. 1-25. Plos One. Queensland, Australia.

Leonard W. D. van Raamsdonk et al. "Current Insights into Monitoring, Bioaccumulation, and Potential Health Eects of Microplastics Present in the Food Chain" 2020. pp. 1-28. Foods.

Jiana Li et al. "Microplastics in mussels along the coastal waters of China" 2021 pp. 177-184. vol. 214. Environmental Pollution. China.

Diogo Neves et al. "Ingestion of microplastics by commercial fish off the Portuguese coast" 2015. pp. 119-126. vol. 101 Marine Pollution Bulletin.Caparica, Portugal.

Nur Hazimah Mohamed et al. "Lifetime Accumulation of Microplastic in Children and Adults" 2021 pp. 5084-5096. vol. 55 Environmental Science & Technology.

Anjar TriWibowo et al. "Microplastic Contamination in the Human Gastrointestinal Tract and Daily Consumables Associated with an Indonesian Farming Community" 2021. pp. 1-10. vol. 13. Sustainability.

Hongwen Xu et al. "Detection and analysis of microplastics in tissues and blood of human cervical cancer patients" 2024. vol. 259 Environmental Research.

Maurizio Forte et al. "Polystyrene nanoparticles internalization in human gastric adenocarcinoma cells" 2016. pp. 126-136. vol. 31 Toxicology in Vitro. Naples, Italy.

Ruxia Qiao et al. "Microplastics induce intestinal inflammation, oxidative stress, and disorders of metabolome and microbiome in zebrafish" 2019 pp. 246-253. vol. 662 Science of the Total Environment. Boston, MA 02115, USA.

Shunji Furukuma et al. "In vitro cytotoxicity evaluation of plastic marine debris by colony-forming assay" 2016 pp. 71-81. Japan.

Sourav Bhattacharjee et al. "Role of membrane disturbance and oxidative stress in the mode of action underlying the toxicity of differently charged polystyrene nanoparticles" 2014. pp. 19321-19330.The Royal Society of Chemistry. The Netherlands.

Hua-Jin Zhao et al. "Microplastics enhance the developmental toxicity of synthetic phenolic antioxidants by disturbing the thyroid function and metabolism in developing zebrafish" 2020. pp. 1-9. vol. 140. Environment International. China.

Baolian Hou et al. "Reproductive toxicity of polystyrene microplastics: In vivo experimental study on testicular toxicity in mice" 2021.pp. 1-11. vol. 405 Journal of Hazardous Materials. Shandong, China.

Jianing Hu et al. "Polystyrene microplastics disturb maternal-fetal immune balance and cause reproductive toxicity in pregnant mice" 2021. pp. 42-50. vol. 106. Reproductive Toxicology. China.

Wanzhen Wang et al. "Polystyrene Microplastics Induced Ovarian Toxicity in Juvenile Rats Associated with Oxidative Stress and Activation of the PERK-eIF2 -ATF4-CHOP Signaling Pathway" 2022. pp. 1-19. Toxics. China.

Fei Xiong et al. "Microplastics induce neurotoxicity in aquatic animals at environmentally realistic concentrations: A meta-analysis" 2023. pp. 1-12. vol. 318 Environmental Pollution. Jiangsu, China.

(56) References Cited

OTHER PUBLICATIONS

Stefania Mariano et al. Micro and Nanoplastics Identification: Classic Methods and Innovative Detection Techniques. 2021. pp. 1-17.Frontiers in Toxicology.

Benjamin O. Asamoah et al. "A prototype of a portable optical sensor for the detection of transparent and translucent microplastics in freshwater" 2019. pp. 161-167. vol. 231 Chemosphere. Dar Es Salaam, Tanzania.

Sanela Martic et al. "Emerging electrochemical tools for microplastics remediation and sensing" 2022. pp. 1-8. Frontiers in Sensors.

Amir Mohammadimehr et al. "Review: Impact of microfluidic cell and particle separation techniques on microplastic removal strategies" 2024, pp. 1-18.vol. 16 Journal of Agriculture and Food Research.

Munawar Hussain et al. "Molecularly Imprinted Polymer Nanoparticles for Formaldehyde Sensing with QCM" 2016, pp. 1-9. Sensors.

Alessandra Cecchini et al. "In Vivo Recognition of Human Vascular Endothelial Growth Factor by Molecularly Imprinted Polymers" 2017 pp. 2307-2312. vol. 17 Nano letters.

Sanjida Yeasmin et al. "Nano gold-doped molecularly imprinted electrochemical sensor for rapid and ultrasensitive cortisol detection" 2022. pp. 1-8. vol. 206. Biosensors and Bioelectronics.

Mohd Marsin Sanagi et al. "Molecularly imprinted polymer solid-phase extraction for the analysis of organophosphorus pesticides in fruit samples" 2013 pp. 155-161. Journal of Food Composition and Analysis. Cairo, Dokki, Egypt.

Konstantin G. Shevchenko et al. "Nano-molecularly imprinted polymers (nanoMIPs) as a novel approach to targeted drug delivery in nanomedicine" 2022 pp. 1-12. vol. 12. Royal Society of Chemistry.

\* cited by examiner

SENSING PLASTICS WITH ELECTRODE SENSOR TO MONITOR FLUID ENVIRONMENTS

BACKGROUND OF THE INVENTION

1. Field of the Invention

This invention relates, generally, to detecting plastics. More specifically, it relates to a system and method to detect the presence of microplastics and nano plastics in a fluid environment.

2. Brief Description of the Prior Art

Plastics are commonly used in everyday life and all across industry. Due to the cost effectiveness and versatility of plastics, plastic materials are commonly used in the packaging, automobile, clothing, and single-use products industries. This has led to a massive buildup of plastic waste across the world. As a result, there has been a growing and increased concern about the fate of plastics where the typical material path as waste stream is to degrade into smaller chains. These smaller chains are known as either microplastics or nanoplastics and they collect in various parts of the global environment. With very little consistent or strict regulation over the disposal of plastic waste, these smaller chains of plastics have recently been found to leak into, and stay within for too long time, the surrounding environment and water. They have seeped into the marine environment, drinking water, food, and in human bodies. Although the full danger micro and nano scaled plastics may have on the human body has not been quantified, their presence in most food products and drinking products is a cause of concern. Microplastics and nanoplastics have been found to have the ability to cross into the blood-brain barrier due to their small size. This could lead to neurotoxicity and affect cellular function of brain cells which could potentially lead to neurodegenerative diseases.

There has been little regulation of plastics or studies conducted on the effects microplastics and nanoplastics could potentially have on the human body. These micro or nano plastics are a growing concern as a pollutant which can potentially affect human lives with little exposure. Currently, there is no simple, effective, and inexpensive method to study and detect the presence of microplastics in a fluid environment. Optical sensors have been used but the measurements are developmental and there is no standard technique for monitoring the presence of microplastics or nanoplastics. Researchers have been considering various technologies to develop a method due to there being no consistent method or sensor which can be used to detect the presence of microplastics or nanoplastics in a fluid environment.

Accordingly, what is needed is an efficient sensor and method which can detect the presence of microplastics and nanoplastics in a fluid environment in both a laboratory setting and in bodies of water. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a sensor electrode and a system for detecting the presence and quantity of microplastics and nano plastics in a fluid environment In an embodiment, the sensor system for detecting microplastics, nano plastics, or both in a fluid environment, comprising: (a) a sensor electrode comprising: (i) a screen-printed carbon electrode, designed and developed for sensing applications; and (ii) a molecularly imprinted polymer layer superposed onto the screen-printed carbon electrode; (b) an electrochemical control unit operably connected to the sensor electrode, wherein the electrochemical control unit device is configured to transmit an electronic current into the sensor electrode; and (c) a data output module configured to allow post processing to generate a detection signal based on the electrochemical response from the sensor electrode.

In some embodiments, the electrochemical control unit may be selected from a group consisting of a conventional electrochemical potentiostat/galvanostat, smart electrochemical analyzer that can be operated using an internet-of-things (IoT)-based unit like a smartphone, miniaturized potentiostat, ultra miniaturized potentiostat, galvanostat, cyclic voltammetry analyzer, and a combination thereof. In some embodiments, the electrochemical control until may be configured to output an electrochemical response of an electric current or voltage, based on the cyclic voltammetry (CV) and differential pulse voltammetry (DPV) transduction approaches, such that the response of the microplastic particles, nano plastic particles, or both can be measured. In some embodiments, the molecularly imprinted polymer layer may be selected from a group consisting of poly(o-phenylenediamine), polyaniline, polypyrrole, poly(4-vinyl-pridine), polymer nanofibers, polyurethane, and a combination thereof.

In some embodiments, the sensor system may further comprise an electronic device communicatively coupled to the electrochemical control unit, data output module, or both. In some embodiments, the electronic device may be configured to wirelessly operate the electrochemical control unit, generate the detection signal from the data output module, or both in real time.

In some embodiments, the sensor system may further comprise a plurality of sensor electrodes, wherein at least one sensor electrode is configured to detect a different micro plastic, nano plastic, size of micro or nano plastic, or some combination of the former beyond the capability of one of sensor electrode. In some embodiments, the plurality of sensor electrodes may be configured such that the plurality of sensor electrodes detect a particular microplastic, nano plastic, or both.

In some embodiments, the sensor system may comprise of two or more heterogenous sensor electrodes such that a first sensor electrode may be configured to detect a different micro plastic, nano plastic, or both than a second sensor electrode.

In some embodiments, the sensor electrode may be configured to detect the presence of micro plastics, nano plastics, or both from a group consisting of polystyrene, polystyrene, polyethylene, polyvinyl, polypropylene, polycarbonate, polyethylene, polyvinyl chloride, polypropylene, polyurethane, nylon, various plastic fragments (including fibers and beads), bisphenol, acrylonitrile butadiene styrene, polymethyl methacrylate, polyamide, and a combination thereof. In some embodiments, the sensor system may further comprise a mediator kit wherein the mediator kit is configured to improve the electrochemical reaction between the sensor electrode and the targeted micro plastics, nano plastics, or both.

Moreover, another aspect of the present disclosure pertains to a sensor electrode configured to detect for the presence and quantity of nanoplastics and microplastics in a fluid environment. In an embodiment, the sensor electrode for detecting microplastics, nano plastics, or both in a fluid environment, the sensor comprising: (a) a screen-printed carbon electrode comprising: (a) a screen-printed carbon electrode comprising: (i) a working electrode; (ii) a counter electrode; and (iii) a silver reference electrode; (b) a molecularly imprinted polymer layer superposed onto the working electrode; (c) a connection interface communicatively coupled to the working electrode; (d) wherein the connection interface is configured to operably connect to an outside electrochemical control until; and (e) wherein the connection interface is configured to transmit an electric current across the screen-printed carbon electrode.

In some embodiments, the molecularly imprinted polymer layer may be further comprised of a plurality of cavities configured to bind to a micro plastic, nano plastic, or both. In some embodiments, the molecularly imprinted polymer layer may be selected from a group consisting of poly(o-phenylenediamine), polyaniline, polypyrrole, poly(4-vinylpridine), polymer nanofibers, polyurethane, and a combination thereof.

In some embodiments, the molecularly imprinted polymer layer may be configured to detect the presence of microplastics, nanoplastics, or both from a group consisting of polystyrene, polyethylene, polyvinyl, polypropylene, polycarbonate, polyethylene, polyvinyl chloride, polypropylene, polyurethane, nylon, various plastic fragments (including fibers and beads), bisphenol, acrylonitrile butadiene styrene, polymethyl methacrylate, polyamide, and a combination thereof.

In some embodiments, the sensor electrode may be configured to detect microplastics, nanoplastics, or both with sizes ranging from about 100 nm to about 500 nm. In some embodiments, the sensor electrode may be configured to detect the presence of microplastics, nanoplastics, or both in concentrations in a fluid environment ranging from about $2.1 \times 10^{-9}$ g/L to about $2.1 \times 10^{-4}$ g/L.

In some embodiments, the molecularly imprinted polymer layer may further comprise a plurality of cavities disposed about the outer surface of the molecularly imprinted polymer layer. Furthermore, in some embodiments, the plurality of cavities may be configured to couple a microplastic, nanoplastic, or both about at least one portion of the outer surface of the molecularly imprinted polymer layer.

In some embodiments, the sensor electrode may further comprise an electrostatic layer disposed about the surface of the screen-printed electrode configured to attract targeted microplastics, nanoplastics, or both with an opposite charge of the targeted microplastics, nanoplastics, or both.

Furthermore, an additional aspect of the present disclosure is a method of detecting microplastics and nanoplastics in a fluid environment. In an embodiment, the method may comprise: (a) disposing a sensor electrode for detecting micro plastics, nano plastics, or both communicatively coupled to an electrochemical control unit, within the fluid environment, the sensor electrode comprising: (i) a screen-printed carbon electrode comprising: (A) a working electrode; (B) a counter electrode; and (C) a silver reference electrode; (ii) a molecularly imprinted polymer layer superposed onto the working electrode; (iii) a connection interface communicatively coupled to the working electrode; (iv) wherein the connection interface is configured to operably connect to an outside research device; and (v) wherein the connection interface is configured to transmit voltages across the screen-printed carbon electrode; (b) transmitting, via the electrochemical control unit, an electronic current into the sensor electrode, thereby inducing an electrochemical response; (c) generating a detection signal based on the electrochemical response from the sensor electrode.

In some embodiments, two or more heterogenous sensor electrodes may be configured to operably connect to the electrochemical control unit. In some embodiments, the two or more heterogenous sensor electrodes may be configured to detect a different microplastic, nano plastic, or both than a second sensor electrode.

In some embodiments, an electronic device can be communicatively coupled to the electrochemical control unit such that the electronic device can be configured to input command to the electrochemical control unit to transmit a current into the sensor electrode. In some embodiments, the detection signal generated may be the response of the sensor electrode to cyclic voltammetry, differential pulse voltammetry, and/or chronoamperometry.

In some embodiments, the sensor electrode for detecting microplastics, nanoplastics, or both can be incorporated into the fluid environment for a time period of at least ten minutes. In some embodiments, the method may further comprise the step of calculating the prominence of the detection signal, the detection signal is the difference between the peak and valley of the detection signal.

Moreover, an additional aspect of the present invention pertains to a method for synthesizing a sensor electrode for detecting microplastics and/or nanoplastics in a fluid environment. The method may comprise: (a) disposing a screen-printed carbon electrode within a hydrochloric acid solution; (b) exposing the screen-printed carbon electrode to a polymerization solution; (c) polymerizing the screen-printed carbon electrode via an electronic current wherein a layer of molecularly imprinted polymer is formed on the screen printed carbon electrode; and (d) eluting the molecularly imprinted polymer matrix by suspending the screen-printed electrode in an elution solution.

In some embodiments, a mediator can be applied onto the screen-printed carbon electrode to increase the polymerizing of the screen-printed carbon electrode by increasing the electrochemical reaction between the polymerization solution and the screen-printed carbon electrode. In some embodiments, the polymerization solution is comprised of 1 mM of a base polymer, 10 µl of a template material, and/or 15 mL of deionized water. Furthermore, in some embodiments, the base polymer may comprise of a polymer selected from a group consisting of poly(o-phenylenediamine), polyaniline, polypyrrole, poly(4-vinylpridine), polymer nanofibers, polyurethane, and/or a combination thereof.

In some embodiments, the template material of the polymerization solution may further comprise of a targeted plastic selected from a group consisting of polystyrene, polyethylene, polyvinyl, polypropylene, polycarbonate, polyethylene, polyvinyl chloride, polypropylene, polyurethane, nylon, various plastic fragments (including fibers and beads), bisphenol, acrylonitrile butadiene styrene, polymethyl methacrylate, polyamide, and a combination thereof. Moreover, in some embodiments, the template material of the polymerization solution may further comprise of a targeted plastic having a thickness of at least 50 nm.

In some embodiments, the molecularly imprinted polymer matrix may be suspended in the elution solution for at least thirty minutes. In some embodiments, the elution solution may be comprised of 50% of deionized water and 50% methanol.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

Figure 1A:
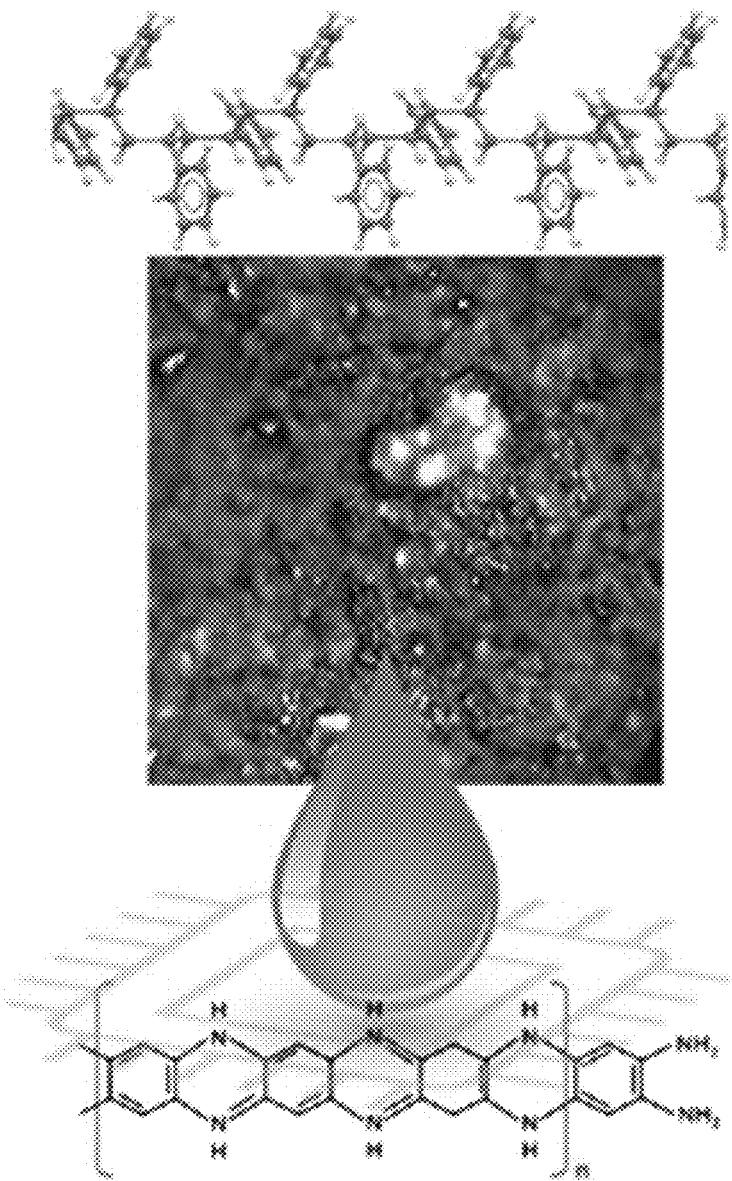
FIG. 1A is a graphical illustration of nano polystyrene (nPS) creating a template on to the matrix of MIP@PoPD, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

As used herein, the term "communicatively coupled" refers to any coupling mechanism known in the art, such that at least one electrical signal may be transmitted between one device and one alternative device. Communicatively coupled may refer to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as packaging and/or delivery of at least one prosthesis and/or prosthetic implant into a surgical pocket). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Method of Detecting Plastics in a Fluid Environment

Figure 14:
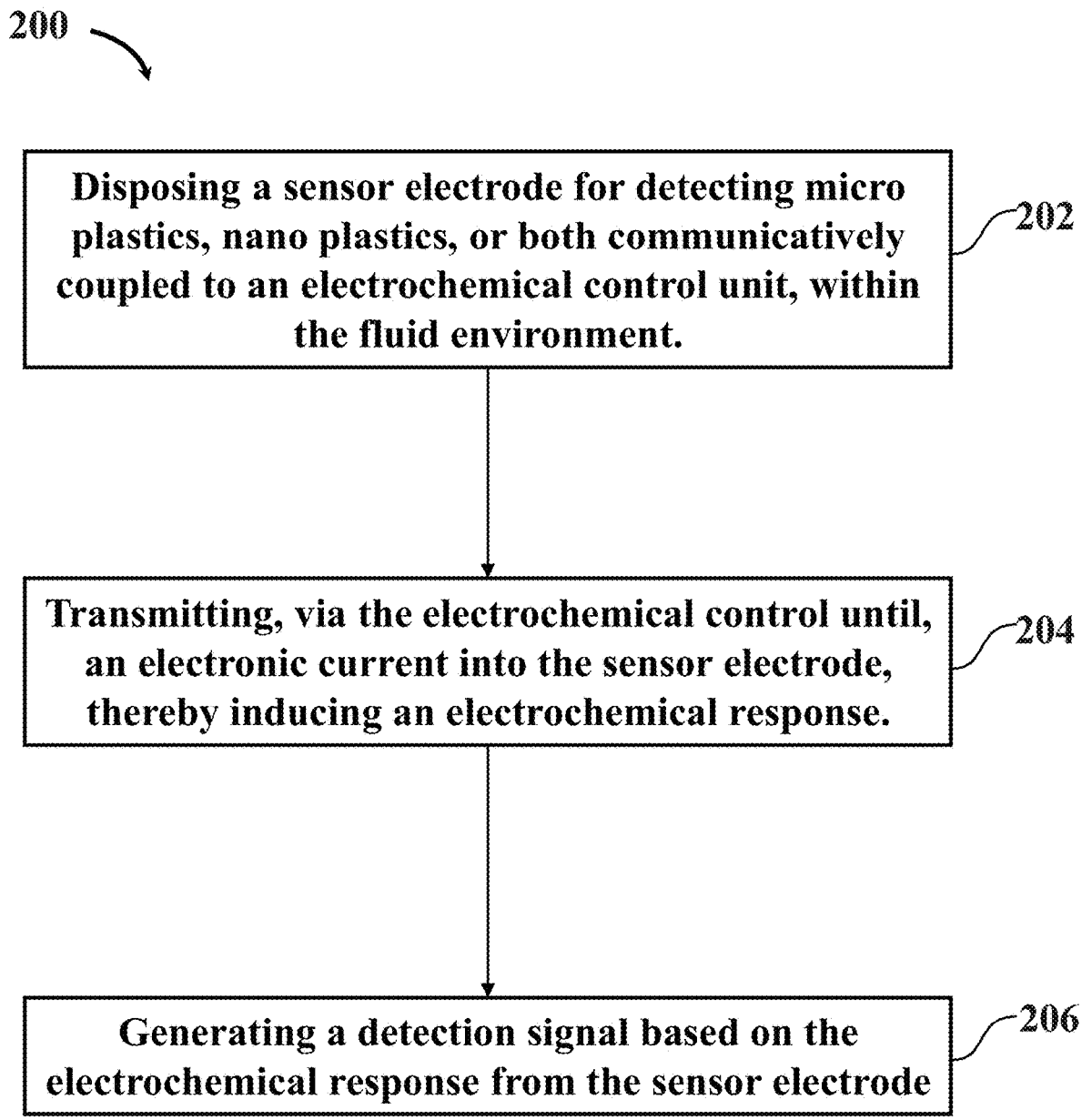
FIG. 14 is a flow chart depicting the steps of a method of detecting micro plastics, nano plastics, or both in a fluid environment, according to an embodiment of the present disclosure.

The present disclosure pertains to a sensor electrode and system that may be implemented in a source of water location, laboratory setting, or in a fluid environment to detect for the presence and quantity of microplastics and/or nanoplastics. FIGS. 1A-1D in conjunction with FIG. 14, depict a method of detecting and/or quantifying microplastics and/or nanoplastics in a fluid environment 200. The steps delineated are merely exemplary of a preferred order for detecting and/or quantifying microplastics and/or nanoplastics in a fluid environment. The steps may be carried out in another order, with or without additional steps included therein. Additionally, the steps may be carried out with alternative embodiments of a sensor electrode, as contemplated.

As shown in FIG. 14, in conjunction with FIG. 1A-1D, the method for detecting and/or quantifying microplastics and/or nanoplastics in a fluid environment 200, via an electrode sensor begins with step 202, disposing a sensor electrode for detecting microplastics and/or nanoplastics that can be communicatively coupled to an electrochemical control unit within a fluid environment.

Moreover, in some embodiments, as shown in FIG. 1A, the sensor electrode as described in step 202 may comprise a screen-printed carbon electrode. The screen-printed carbon electrode may comprise of a working electrode, a counter electrode and a silver reference electrode. In some embodiments, the sensor electrode may further comprise of a molecularly imprinted polymer layer superposed onto the working electrode. Additionally, in some embodiments, the sensor electrode may further comprise a connection interface that can be communicatively coupled to the working electrode.

In some embodiments, the molecularly imprinted polymer layer may further comprise of a plurality of cavities disposed about the outer surface of the molecularly imprinted polymer layer. In some embodiments, the plurality of cavities may be configured to couple and/or bind a targeted microplastic and/or nanoplastic to the outer surface of the molecularly imprinted polymer matrix.

Moreover, in some embodiments, the plurality of cavities may be configured to trap the targeted microplastic and/or nanoplastic material to allow for an electrochemical test to be performed such that the quantity of the targeted microplastic and/or nanoplastic material can be calculated. Furthermore, in some embodiments, at least one cavity of the plurality of cavities configured to bind to a targeted microplastic and/or nanoplastic having a width ranging from about 50 nm to about 1000 nm. For example, in some embodiments, the width of at least one of the cavities of the plurality of cavities may have a width of 100 nm.

Additionally, in some embodiments, the connection interface may be configured to operably connect to an outside research device. Furthermore, in some embodiments, the connection interface can be configured to transmit voltages across the entirety of the screen-printed carbon electrode.

In an alternative embodiment, a plurality of sensor electrodes may be configured to operably connect to the electrochemical control unit such that the plurality of sensor electrodes may detect a microplastic and/or nanoplastic in a fluid environment. Moreover, in some alternative embodiments, the plurality of sensor electrodes can be configured to detect a plurality of microplastics and/or nanoplastics such that at least one sensor electrode can be configured to detect a different microplastic and/or nanoplastic than at least one of the other sensor electrodes.

In alternative embodiment, two or more heterogenous sensor electrodes may be configured to operably connect to the electrochemical control unit such that a first sensor electrode is configured to detect a different microplastic and/or nanoplastic than a second sensor electrode. Moreover, in some alternative embodiments, the two or more heterogeneous sensor electrodes may be configured to operably connect to the electrochemical control unit such that the two or more heterogenous sensor electrodes may detect a particular microplastic and/or nanoplastic in a fluid environment.

Referring again to FIGS. 1A-1D, in conjunction with FIG. 14, next, method 200 may proceed to step 204. At step 204, a voltage may be transmitted via an electrochemical control unit across the sensor electrode such that the voltage can induce an electrochemical response on the sensor electrode.

Finally, at step 206, a detection signal may be generated based on the electrochemical response from the sensor electrode.

Figure 1B:
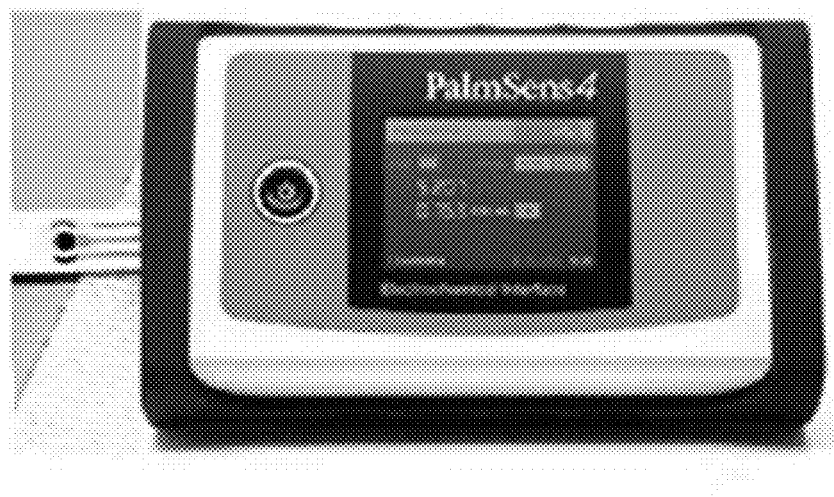
FIG. 1B is a graphical illustration of the electrode sensor undergoing electrochemical testing by a miniaturized potentiostat, according to an embodiment of the present disclosure.
Figure 1C:
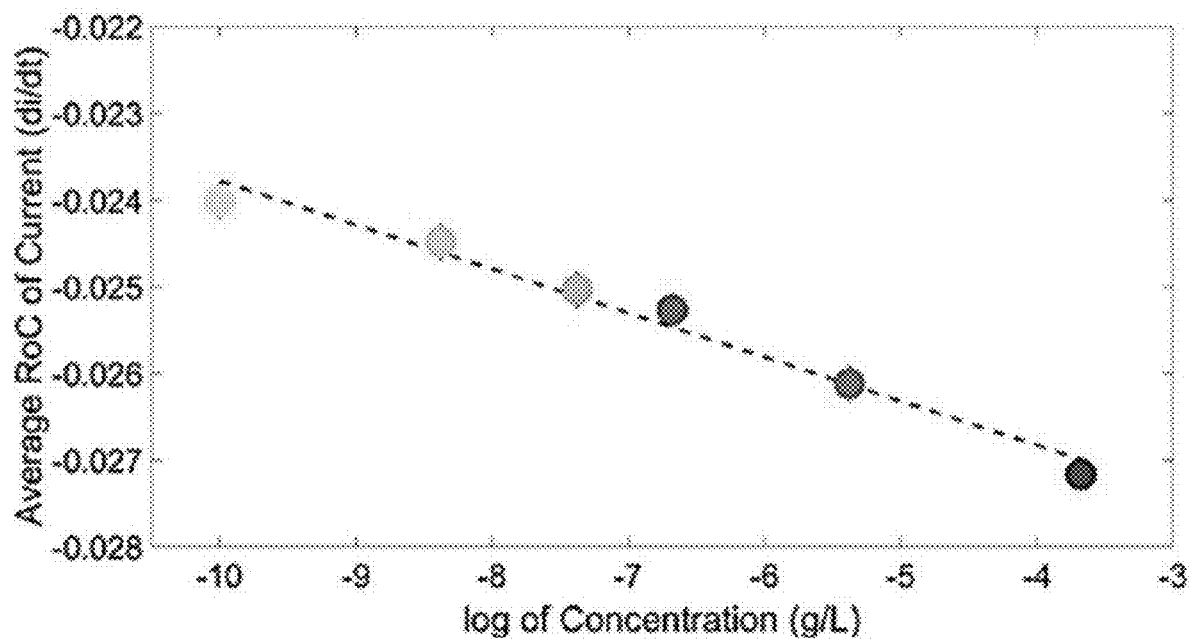
FIG. 1C is a plot illustrating the average RoC of Current against the log of Concentration, according to an embodiment of the present disclosure.
Figure 1D:
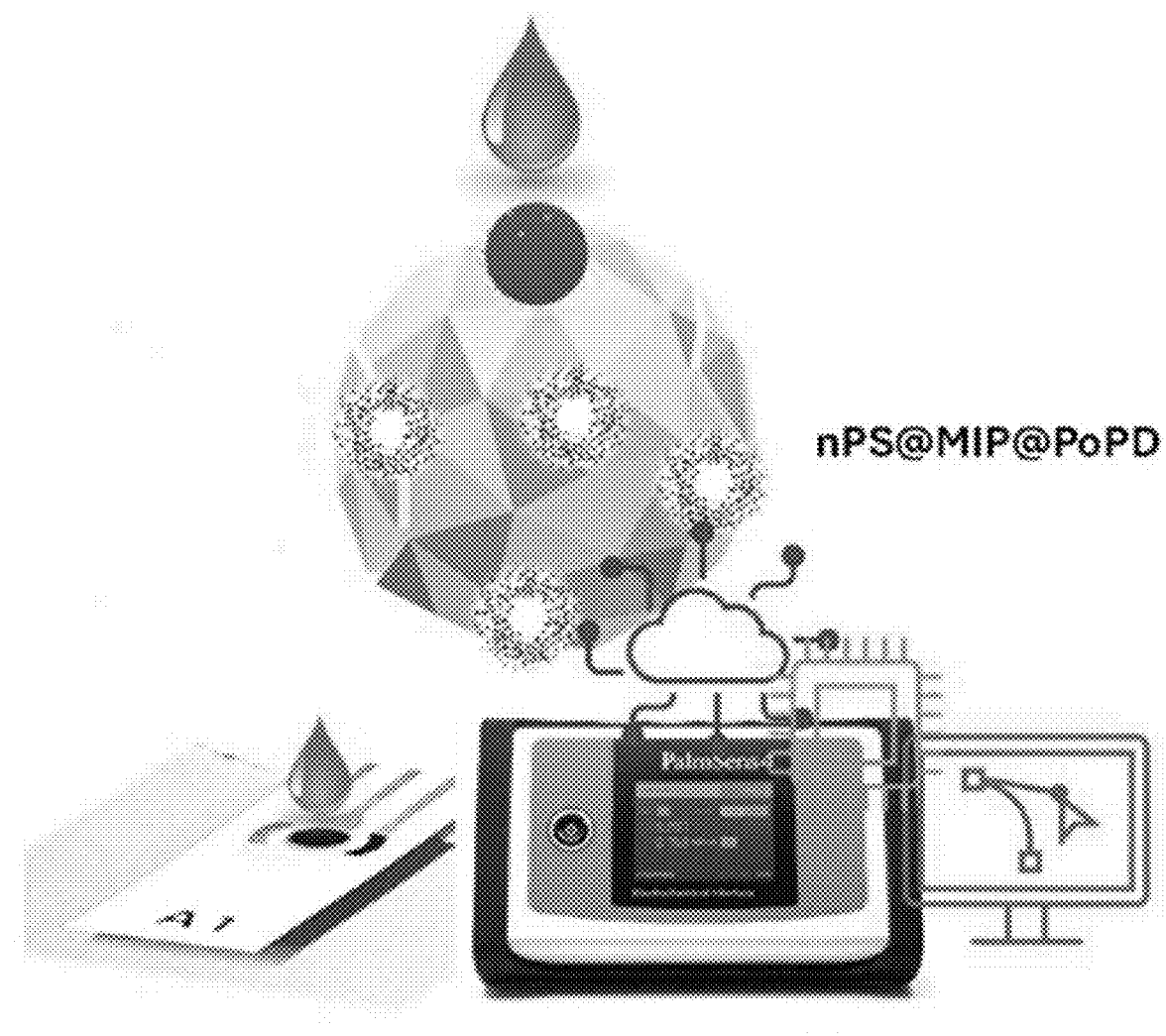
FIG. 1D is a graphical illustration nPS@MIP@PoPD undergoing electrochemical sensing, according to an embodiment of the present disclosure.

Furthermore, in an embodiment, as shown in FIG. 1D, an electronic device may be communicatively coupled to the electrochemical control unit. The electronic device can be configured to wirelessly input commands to the electrochemical control unit such as transmitting a voltage across the sensor electrode and/or generate a detection signal based on the electrochemical response. The electronic device may allow a user to perform method 200 a plurality of times multiple times removed from the test environment.

Furthermore, method 200 may further comprise the step of calculating the prominence of the detection signal. The prominence of the generated detection signal may be the calculated difference between the peak and valley of the detection signal. The prominence of the detection signal may allow a user to quantify the quantity of a microplastic and/or nanoplastic in a fluid environment.

In some alternative embodiments, the sensor electrode may be comprised of a molecularly imprinted polymer layer that may be configured to detect for a plurality of microplastic and/or nanoplastics in a fluid environment. In an alternative embodiment, the sensor electrode configured to detect for a plurality of micro and/or nano sized plastics in a fluid environment may be utilized to quantify the total number of microplastics and/or nanoplastics in a fluid environment. In this alternative embodiment, the sensor electrode may be configured to detect the presence and quantify the totality of micro and/or nanoplastics in a fluid environment.

Method of Synthesizing

Figure 2A:
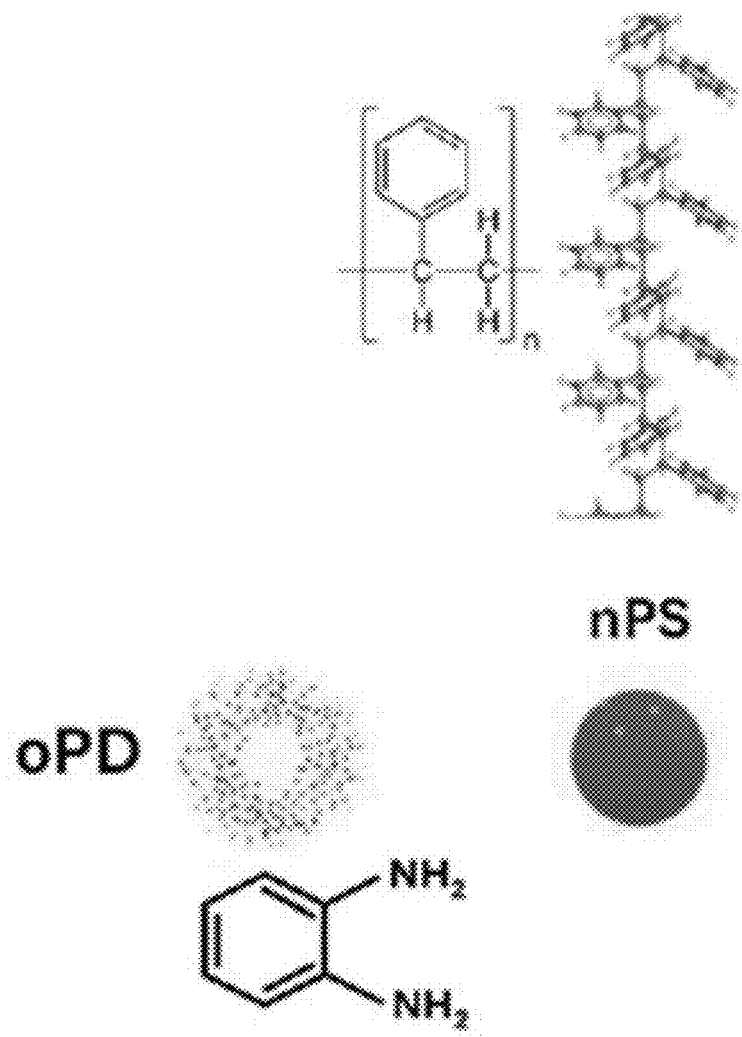
FIG. 2A is a graphical illustration graphical illustration of nPS, oPD, and the electrochemical polymerization of oPD utilized in designing MIP@PoPD, according to an embodiment of the present disclosure.
Figure 2B:
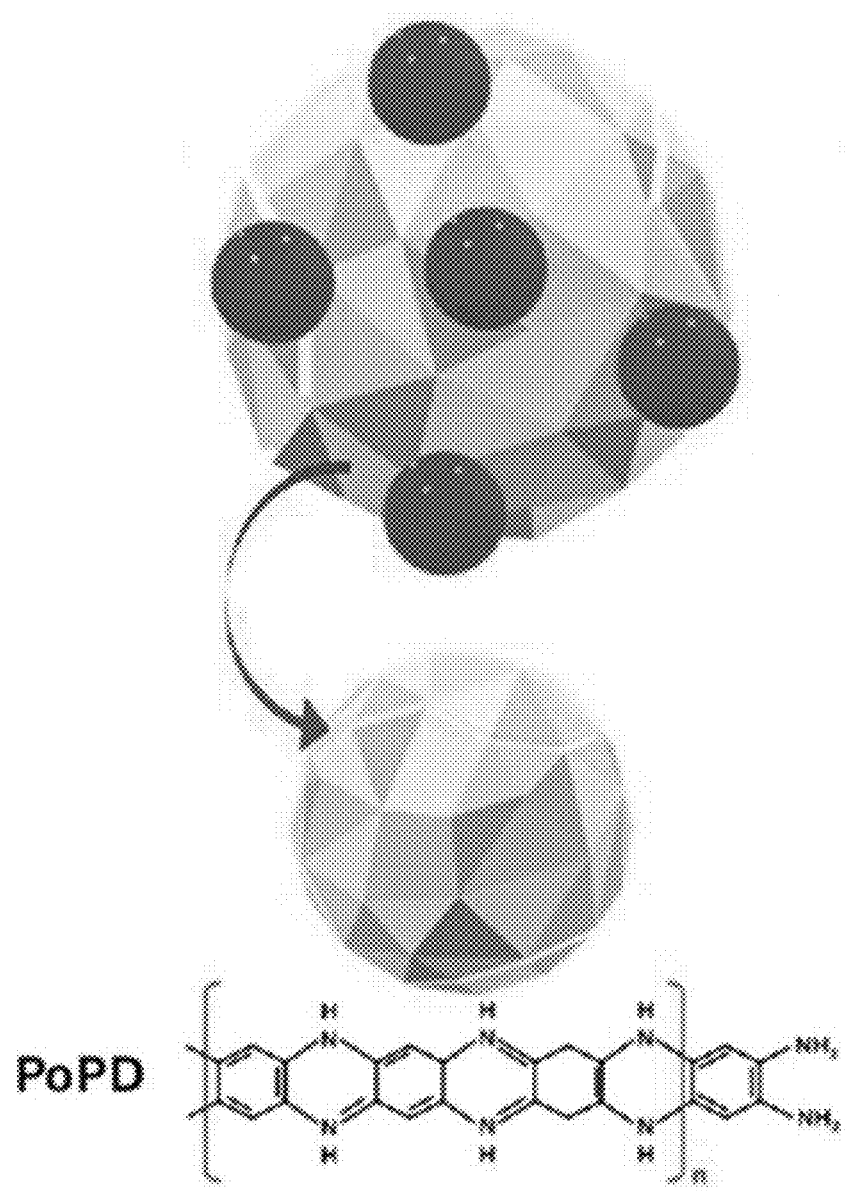
FIG. 2B is a graphical illustration graphical illustration of POPD+nPS binding onto PoPD, according to an embodiment of the present disclosure.
Figure 2C:
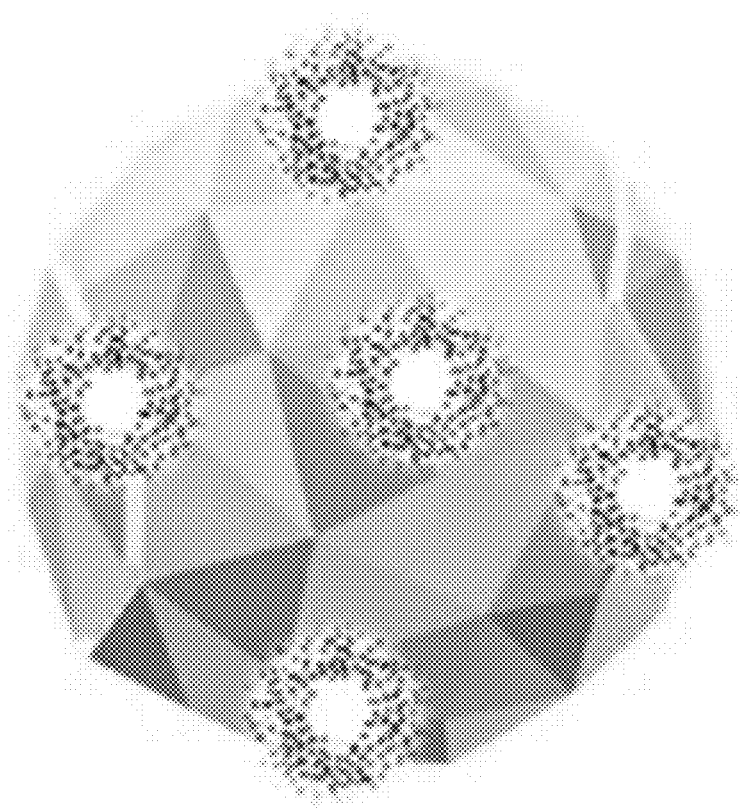
FIG. 2C is a graphical illustration of MIP@PoPD after elution, according to an embodiment of the present disclosure.
Figure 15:
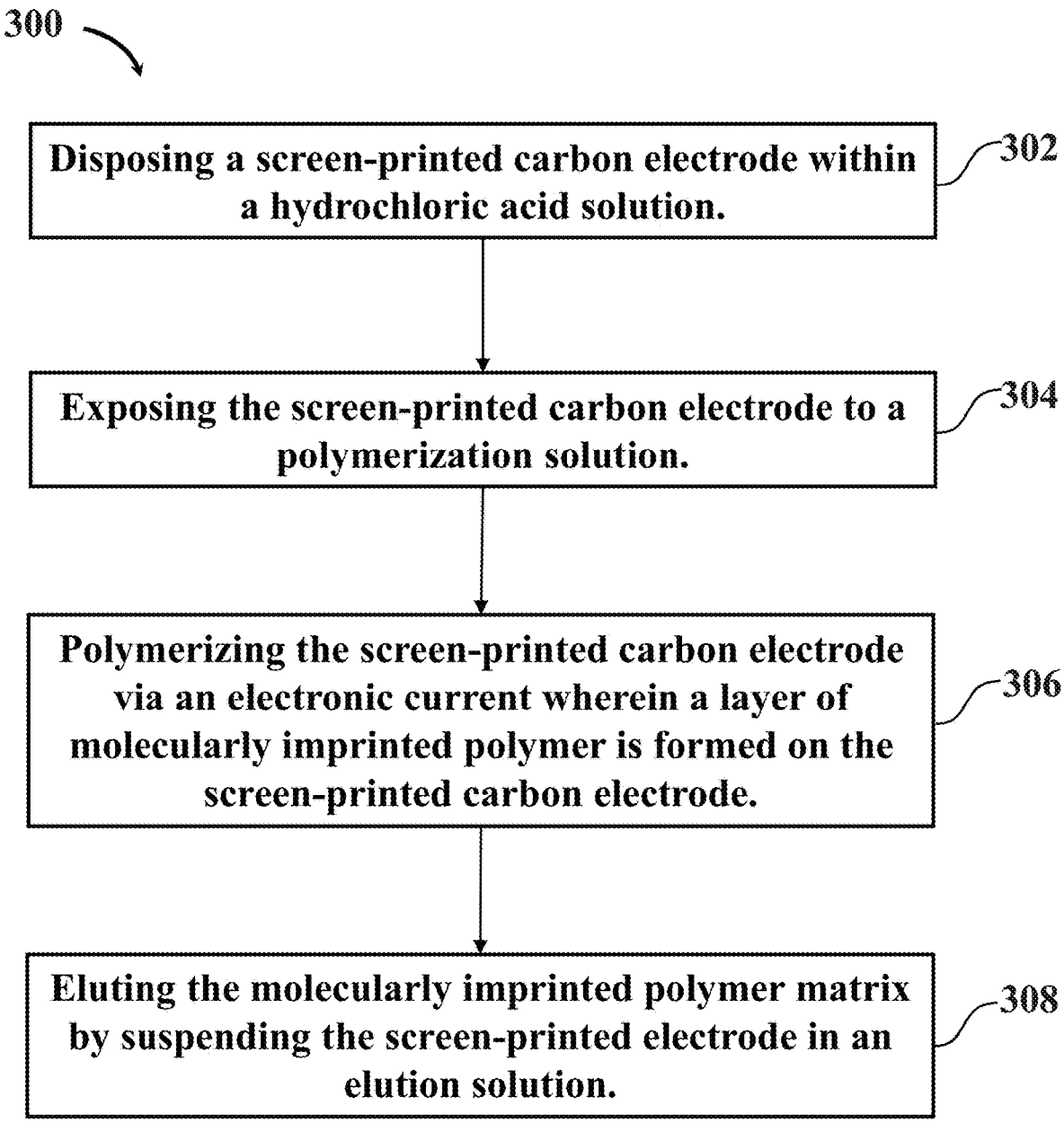
FIG. 15 is a flow chart depicting the steps of a method for synthesizing a sensor electrode for detecting micro plastics, nano plastics, or both in a fluid environment, according to an embodiment of the present disclosure.

Referring now to FIG. 15, in conjunction with FIGS. 2A-2C, a method is depicted for synthesizing a sensor electrode for detecting microplastics and/or nanoplastics in a fluid environment 300. The steps delineated are merely exemplary of a preferred order for synthesizing a sensor electrode for detecting microplastics and/or nanoplastics in a fluid environment 300. Additionally, the steps may be carried out with alternative embodiments of the sensor electrode.

As shown in FIGS. 2A-2C, in conjunction with FIG. 15, in an embodiment, the method for synthesizing a sensor electrode 300 begins with the step 302, disposing a screen-printed carbon electrode within a hydrochloric acid solution.

The next step, step 304, may comprise exposing the screen-printed carbon electrode to a polymerization solution. In some embodiments, the polymerization solution may be comprised of about 1 mM of o-phenylenediamine, 10 μl of a template material, 15 mL of deionized water, and/or about 100 nm to about 500 nm of a targeted plastic.

Furthermore, in some embodiments, the targeted plastic may be comprised of a targeted microplastic and/or nanoplastic that has a thickness of at least 100 nm. Additionally, in some embodiments, the targeted microplastic and/or nanoplastic material may be selected from a group of commonly used plastic in industries, laboratory settings, and/or in commercial settings. Non limiting examples of the targeted plastic may include polystyrene, polyethylene, polyvinyl, polypropylene, polycarbonate, polyethylene, polyvinyl chloride, polypropylene, polyurethane, nylon, various plastic fragments (including fibers and beads), bisphenol, acrylonitrile butadiene styrene, polymethyl methacrylate, polyamide, and a combination thereof. For ease of reference, the exemplary embodiment disclosed herein refers to polystyrene, but this description should not be interpreted as exclusionary as to other targeted plastic materials.

Moreover, in an alternative embodiment, a mediator material may be applied throughout the surface of the screen-printed carbon electrode. The mediator material may be configured to enhance the polymerization of the screen-printed carbon electrode via increasing the electrochemical reaction that can occur between the polymerization solution and the screen-printed carbon electrode. In some alternative embodiments, the mediator material may be comprised of an electrostatic layer configured to attract the targeted plastic material with an opposite charge of the targeted plastic material.

Referring again to FIG. 15, in conjunction with FIGS. 2A-2C, the method 300 may further comprise the step 306 of polymerizing the screen-printed carbon electrode via an electronic current such that a layer of molecularly imprinted polymer can be formed on the screen-printed carbon electrode.

Moreover, in some embodiments, the electronic current utilized in polymerizing the screen-printed carbon electrode can be a cyclic voltammetry process. The cyclic voltammetry process may comprise a voltage having a range of at least 0 V to about 1 V at 50 mV/s for about 30 cycles and/or until the polymerization of the screen-printed carbon electrode has been completed depending on the targeted plastic material utilized as a template. As such, in some embodiments, for example, the cyclic voltammetry process may comprise a voltage of about 0.5 V.

As shown in FIG. 15, in conjunction with FIGS. 2B-2C, in an embodiment, the method 300 may comprise the last step, step 308, of eluting the molecularly imprinted polymer matrix by suspending the screen-printed electrode in an elution solution.

In some embodiments, the elution solution may be composed of equal parts water and methanol such that the targeted plastic may be eluted from the sensor electrode leaving a plurality of cavities across the matrix imprinted polymer layer superposed onto the sensor electrode. Furthermore, in an embodiment, the sensor electrode may be suspended in the elution solution for a time period of at least ten minutes such that the targeted plastic material has been removed from the matrix imprinted polymer layer.

Sensor Electrode

The present disclosure further pertains to an electrode sensor that may be introduced into a source of water location, a laboratory setting, or in a fluid environment. In embodiment, the sensor electrode may comprise of a screen-printed carbon electrode. The screen-printed carbon electrode may further comprise a working electrode, a counter electrode, and a conductive metal reference electrode. Furthermore, in an embodiment, the sensor electrode may further comprise a molecularly imprinted polymer layer that may be superposed onto the surface of the working electrode. Moreover, in an embodiment, the sensor electrode may further comprise a connection interface that may be communicatively coupled to the working electrode. The connection interface may be configured such that it may operably connect to an outside electrochemical control unit.

As shown in FIG. 1A, in conjunction with FIG. 2C, in some embodiments, the sensor electrode may comprise of a molecularly imprinted polymer layer. The molecularly imprinted polymer layer may be comprised of a plurality of cavities that can be configured to bind and/or trap a targeted microplastic and/or nanoplastic material.

Furthermore, in some embodiments, the molecularly imprinted polymer layer may be comprised of a polymer that can be configured to bind to a targeted plastic material such that the targeted plastic material may form a plurality of cavities within the molecularly imprinted matrix. In some embodiments, the molecularly imprinted polymer layer may be selected from a group consisting of poly(o-phenylenediamine), polyaniline, polypyrrole, poly(4-vinylpridine), polymer nanofibers, and/or polyurethane. For ease of reference, the exemplary embodiment disclosed herein refers to the polymer poly(o-phenylenediamine), but this description should not be interpreted as exclusionary to other polymers. In some alternative embodiments, the molecularly imprinted polymer layer may be comprised of a combination of polymers consisting from the group as previously described above.

In some embodiments, the sensor electrode may be configured to detect the present of microplastics and/or nanoplastics having a thickness and/or size ranging from about 50 nm to about 1000 nm. For example, in some embodiments, the microplastic and/or nano plastic material may comprise a thickness of 100 nm. Additionally, for example, in some alternative embodiments, the microplastic and/or nano plastic may comprise a thickness of 500 nm.

Moreover, in some embodiments, the sensor electrode may be configured to detect the presence of microplastics and/or nanoplastics in concentrations in a fluid environment having a range from about $2.1 \times 10^{-9}$ g/L to about $2.1 \times 10^{-4}$ g/L. For example, in some embodiments, the sensor electrode can be configured to detect the presence of microplastics and/or nanoplastics in a fluid environment having a concentration of $2.1 \times 10^{\wedge}(-5)$.

In some embodiments, the molecularly imprinted polymer layer may further comprise of a plurality of cavities disposed about the outer surface of the molecularly imprinted polymer layer. In some embodiments, the plurality of cavities may be configured to couple and/or bind a targeted microplastic and/or nanoplastic to the outer surface of the molecularly imprinted polymer matrix.

Moreover, in some embodiments, the plurality of cavities may be configured to trap the targeted microplastic and/or nanoplastic material to allow for an electrochemical test to be performed such that the quantity of the targeted microplastic and/or nanoplastic material can be calculated. Furthermore, in some embodiments, at least one cavity of the plurality of cavities configured to bind to a targeted microplastic and/or nanoplastic having a width ranging from about 50 nm to about 1000 nm. For example, in some embodiments, the width of at least one of the cavities of the plurality of cavities may have a width of 100 nm.

In some alternative embodiments, the sensor electrode may be comprised of a molecularly imprinted polymer layer that may be configured to detect for a plurality of microplastic and/or nanoplastics in a fluid environment. In an alternative embodiment, the sensor electrode configured to detect for a plurality of micro and/or nano sized plastics in a fluid environment may be utilized to quantify the total number of microplastics and/or nanoplastics in a fluid environment. In this alternative embodiment, the sensor electrode may be configured to detect the presence and quantify the totality of micro and/or nanoplastics in a fluid environment.

In some alternative embodiments, the sensor electrode may further comprise a mediator that may be applied onto the screen-printed carbon electrode such that it may increase the reaction of targeted microplastics and/or nanoplastics when introduced into a fluid environment.

Furthermore, in an alternative embodiment, the sensor electrode may further comprise an electrostatic layer that may be disposed about the surface of the screen-printed carbon electrode. The electrostatic layer can be configured to attract the targeted microplastics and/or nanoplastics via the electrostatic layer having an opposite charge of the targeted microplastics and/or nanoplastics.

Electrode Sensor System for Detecting Plastics in a Fluid Environment

The disclosure further pertains to a sensor electrode that may be implemented in a source of water location, laboratory setting, or in a fluid environment to detect for the presence and quantity of microplastics and/or nanoplastics. In an embodiment, the system for detecting microplastics and/or nanoplastics may comprise of a sensor electrode having a screen-printed carbon electrode and/or a molecularly imprinted polymer layer superposed onto the screen-printed carbon electrode. In this embodiment, the system may further comprise an electrochemical control unit that may be operably connected to the sensor electrode such that the electrochemical control unit can be configured to transmit an electronic current into the sensor electrode.

Furthermore, in this embodiment, the system may further comprise a data output module that can be configured to generate a detection signal based on the electrochemical response from the sensor electrode. Additionally, in an embodiment, the connection interface can be configured to transmit electric currents across the screen-printed electrode.

As shown in FIGS. 1B, in some embodiments, the electrochemical control unit may be selected from a group consisting of a potentiostat, miniaturized potentiostat, ultra miniaturized potentiostat, galvanostat, and/or cyclic voltammetry analyzer. For ease of reference, the exemplary embodiment disclosed herein refers to a potentiostat, but this description should not be interpreted as exclusionary to other electrochemical sensing devices. Additionally, the electrochemical control unit may be configured to an output electrochemical response of an electric current and/or voltage such that the response of the response of the micro plastics and/or nano plastics can be measured by the electrochemical control unit.

Furthermore, in some embodiments, the molecularly imprinted polymer layer may be comprised of a polymer that can be configured to bind to a targeted plastic material such that the targeted plastic material may form a plurality of cavities within the molecularly imprinted matrix. In some embodiments, the molecularly imprinted polymer layer may be selected from a group consisting of poly(o-phenylenediamine), polyaniline, polypyrrole, poly(4-vinylpridine), polymer nanofibers, and/or polyurethane. For ease of reference, the exemplary embodiment disclosed herein refers to the polymer poly(o-phenylenediamine), but this description should not be interpreted as exclusionary to other polymers.

Additionally, in some embodiments, the connection interface may be configured to operably connect to an outside research device. Furthermore, in some embodiments, the connection interface can be configured to transmit voltages across the entirety of the screen-printed carbon electrode.

Moreover, in some embodiments, the targeted microplastic and/or nanoplastic material may be selected from a group of commonly used plastic in industries, laboratory settings, and/or in commercial settings. Non limiting examples of the targeted plastic may include polystyrene, polyethylene, polyvinyl, polyethylene, polyvinyl chloride, polypropylene, polyurethane, nylon, various plastic fragments (including fibers and beads), polycarbonate, bisphenol, acrylonitrile butadiene styrene, polymethyl methacrylate, polyamide, and/or a combination thereof. For ease of reference, the exemplary embodiment disclosed herein refers to polystyrene, but this description should not be interpreted as exclusionary as to other targeted plastic materials.

In an alternative embodiment, a plurality of sensor electrodes may be configured to operably connect to the electrochemical control unit such that the plurality of sensor electrodes may detect a microplastic and/or nanoplastic in a fluid environment. Moreover, in some alternative embodiments, the plurality of sensor electrodes can be configured to detect a plurality of microplastics and/or nanoplastics such that at least one sensor electrode can be configured to detect a different microplastic and/or nanoplastic than at least one of the other sensor electrodes.

In an alternative embodiment, a plurality of sensor electrodes may be configured to operably connect to the electrochemical control unit such that the plurality of sensor electrodes may detect a microplastic and/or nanoplastic in a fluid environment. Moreover, in some alternative embodiments, the plurality of sensor electrodes can be configured to detect a plurality of microplastics and/or nanoplastics such that at least one sensor electrode can be configured to detect a different microplastic and/or nanoplastic than at least one of the other sensor electrodes.

In alternative embodiment, two or more heterogenous sensor electrodes may be configured to operably connect to the electrochemical control unit such that a first sensor electrode is configured to detect a different microplastic and/or nanoplastic than a second sensor electrode. Moreover, in some alternative embodiments, the two or more heterogeneous sensor electrodes may be configured to operably connect to the electrochemical control unit such that the two or more heterogenous sensor electrodes may detect a particular microplastic and/or nanoplastic in a fluid environment.

In an alternative embodiment, the sensor system may further comprise a mediator kit comprising of multiple chemicals and electrostatic layers that can be applied onto the surface of the screen-printed carbon electrode to enhance the interaction between the microplastics and/or nanoplastics with the sensor electrode.

EXAMPLES

Example #1

Electrochemical method for the screening and sensing of nano/micro-plastic in point-of-care setting.

Introduction

Since their commercialization in the early 20th century, all types of plastics have now become an integral part of nearly every business and product due to their inherent versatility, durability, scalability, and affordability. The demand for plastic products is at high level and captured an estimated market value of over 700 billion dollars in 2023. However, the management of these plastics during/after their life cycle requires greater attention as their degradation poses serious problems for human health and the environment in the form of micro/nano plastics (M/N-Ps). Plastic products can be found in nearly every industry such as packaging, automobiles, clothing, single-use products, etc. With this great deal of versatility and cost-effectiveness, the plastic market has seen explosive growth since its inception. Plastic waste has also continually grown over the years, as there are all sorts of products being mass-produced. In 2023 alone, approximately 390 million metric tons of plastic waste was generated, with projections expecting the number to continue to rise.

The M/N-Ps are degraded plastic compounds which have broken down into smaller chains of their original polymer due to abrasion, ultraviolet degradation, and exposure to the environment. These M/N-Ps are classified by the diameter of the particles, 1 µm-1 mm/1 nm-1 µm, respectively. These particles are continually being found everywhere they should not be, such as in drinking water, the marine environment, food, and within human bodies. One of the most common MN-Ps in the environment is polystyrene (PS), which is found in its macro form in a wide assortment of packaging, appliances, food service, and insulation. These particles persist as they do not degrade naturally in the environment and are not being handled properly by waste management facilities. Even at low concentrations in water, microplastics bioaccumulate through the food chain leading to concentrations of microplastics in marine life such as mussels and fish. With all these factors combined, it is not surprising that MN-Ps are continuously being found in human bodies.

Although the health risks of these particles require more research, initial studies into the matter suggest that ingestion of M/N-Ps can induce inflammatory responses and oxidative stress in the gastrointestinal system Although touted as inert particles, M/N-Ps have also displayed cytotoxicity during in vitro testing, with some studies finding smaller nanoparticles to cause more pronounced adverse effects. These particles have also been found to act as a sponge for endocrine-disrupting compounds which can lead to thyroid dysfunction as well as dysfunction of the male and female reproductive system in mammals. M/N-Ps also have been found to have the ability to cross the blood-brain barrier (BBB) due to their small size, causing neurotoxicity in aquatic animals and affecting the cellular function of the brain cells which may cause neurodegenerative diseases.

With their ever-increasing concentration in the environment and evidence of their detrimental health effects, it is apparent that there is an urgent need for rapid, accurate, on-the-field testing for M/N-Ps. Current means for testing M/N-Ps include Raman spectroscopy, scanning electron microscopy (SEM), and fluorescence microscopy, which are good approaches but expertise-intensive processes and not viable for field testing as they require expensive equipment and expertise to use. Even with these methods, due to their scale, it became very challenging to detect M/N-Ps when attempting to identify or quantify plastics at the nanoscale in the field. Designing and developing highly sensitive analytical tools for the detection of M/N-Ps are urgently required for water quality assessment and monitoring. Presently, various sensors, mainly optical and electrical, have been reported for M/N-Ps sensing but are not able to justify the sensing mechanism because M/N-Ps cannot be detected using recognizing elements and researchers are considering different technologies and disciplines to tackle this issue from different perspectives.

To overcome the challenges associated with M/N-Ps sensing, molecularly imprinted polymers (MIPs) were explored for electrochemical sensing of M/N-Ps at a low concentration and with a high sensitivity. The MIP-based sensing approach is beneficial due to the tunable accuracy via generating cavities according to the shape, size, and orientation of a target analyte. Additionally, MIP-based approaches are emerging as adoptable due to mass-producible production, cost-effectiveness, and possibilities of field-testing applications. Specifically designed MIPs are synthetic polymers that are manufactured systematically to create cavities within their matrix that allow for the binding of specific target molecules. MIPs have been used extensively over the last few decades in sensing due to their selectivity, ease of manufacture, sensitivity, and viability for mass production. Due to good control over the surface properties, MIPs have been used for several other advanced fields such as sensing/extraction of gases, biomarkers/hormones, and trapping of environmental contaminants. Additionally, research in the field of drug delivery suggests that MIPs may also be viable for the selective capture of nanoscale molecules/particles.

The MIPs of poly(o-phenylenediamine (PoPD) were fabricated using electro-polymerization of monomer i.e., o-phenylenediamine (oPD) onto screen-printed carbon electrode (SPCE) for the electrochemical sensing of nanoscale polystyrene (nPS). The MIP-PoPD was fabricated against 100 and 500 nm sizes of PS. The fabrication of MIP-PoPD, against PS, was characterized using electrochemical techniques and further validated using Raman spectroscopy. The fabricated MIP-PoPD/SPCE were tested as a function of PS concentrations (for both 100 and 500 nm). It was observed that MIP-PoPD is more efficient for the detection of PS of 500 nm. Overall, in both cases, the developed platform can perform a selective screening of both sizes of PS in real water samples (See FIGS. 2A-2D). Such developed sensing is miniaturized and interfaced with a miniaturized potentiostat (M-P) which is mobile and programmable. Therefore, point-of-care (POC) PS sensing can be achieved in future for environmental surveillance applications to support policies on using the developed systems as a foundation.

Materials and Experimental Methods

All chemicals were purchased from Sigma-Aldrich Co. (St. Louis, MO, USA) and are lab-grade. The polymerization solution was composed of DI water, polystyrene microparticles of 100 nm and 500 nm diameters, and O-phenylenediamine (oPD). The elution solution was composed of equal parts water and methanol. All the electrochemical experiments and characterizations were performed using a PalmSens4 potentiostat (Houten, Netherlands). The electrolyte solution utilized for characterization was prepared in DI water and phosphate buffer saline (PBS) containing 5 mM of potassium ferricyanide $K_3[Fe(CN)_6]$ and potassium ferrocyanide $K_4[Fe(CN)_6]$. Some of the electrochemical studies were conducted using DI water as an electrolyte.

The electrochemical experiments were performed on ItalSens SPCE electrode, specially designed for electrochemistry and electrochemical sensor fabrication, which uses a 3 mm carbon working electrode, carbon counter electrode, and silver reference electrode. All concentrations of polystyrene were made using DI water and diluted to achieve the various concentrations. Raman technology-related experimentations (imaging and spectrum) were performed using a confocal microscope-based Raman spectrometer (LabRAM HR Evolution, Horiba Scientific). The laser beam (2.7 mW, 532 nm wavelength) and image magnification (or surface area) were adjusted to get high quality data in each experiment.

Fabrication of MIP@PoPD/SPCE Sensing Electrode

The SPCE was submersed in a 1 M solution of hydrochloric acid to ensure a clean surface for polymerization and subjected to −1 V to 1 V at a step potential of 0.1 V for 10 cycles. Once cleaned, the electrode was gently rinsed with DI water and air dried before being characterized using cyclic voltammetry (CV) (from −1 V to 1 V, scan rate of 50 mV/s, for three cycles) and differential pulse voltammetry (DPV) (from −1 V to 1 V, pulse potential 0.01 V, pulse time 0.01 s). The working electrode was then exposed to 100 μL of the polymerization solution and underwent a CV scan from 0 V to 1 V at 50 mV/s for 30 cycles. The polymerization solution was composed of 1 mM of o-phenylenediamine, and 10 μL of the template, 500 nm or 100 nm PS, in 15 mL of DI water. Once polymerized, the electrode was cleaned and characterized again.

The polymer matrix was then eluted by suspending the electrode in a 50/50 solution of methanol and DI water for 30 minutes to weaken and break the bonds between the PS (100 and 500 nm) and the poly(o-phenylenediamine) (PoPD). The sensor was then rinsed, dried, and run through the characteristic tests discussed in the results and discussion section.

Testing and Data Analysis

Once the MIP had been formed, 100 μL of the solution containing the desired nano PS solution was pipetted onto the working electrode and given 10 minutes of incubation time. The solutions tested were $4.2 \times 10^{-4}$ g/L, $2.1 \times 10^{6}$ g/L, $4.2 \times 10^{-7}$ g/L, $4.2 \times 10^{-8}$ g/L, $2.1 \times 10^{-9}$ g/L, and 0 g/L. Once the samples were ready, they were subjected to CV (three cycles from −1 V to 1 V) at 50 mV/s, DPV (from −1 V to 1 V, pulse potential 0.01 V, pulse time 0.01 s), and finally chronoamperometry (10 V for 30 minutes). The data was then collected, transferred to CSV, and analyzed in MATLAB. The response peak was observed at lower V, but the experimentation was performed in a long V window to observe all the possible electrochemical changes that may occur in electro-response characteristic of MIP and during nPS sensing.

Prominence calculations, which measure the difference between the peak and valley of a signal, were performed using a built-in function in the PalmSens software, PSTrace 5.9. All other data analyses such as linear regression fits, and statistical significance calculations were done using MATLAB. To include the concentration of 0 g/L into the logarithmic concentration axis, the data point was labeled as $10^{-10}$ g/L for all linear regression fits.

Results and Discussion

Figure 3A:
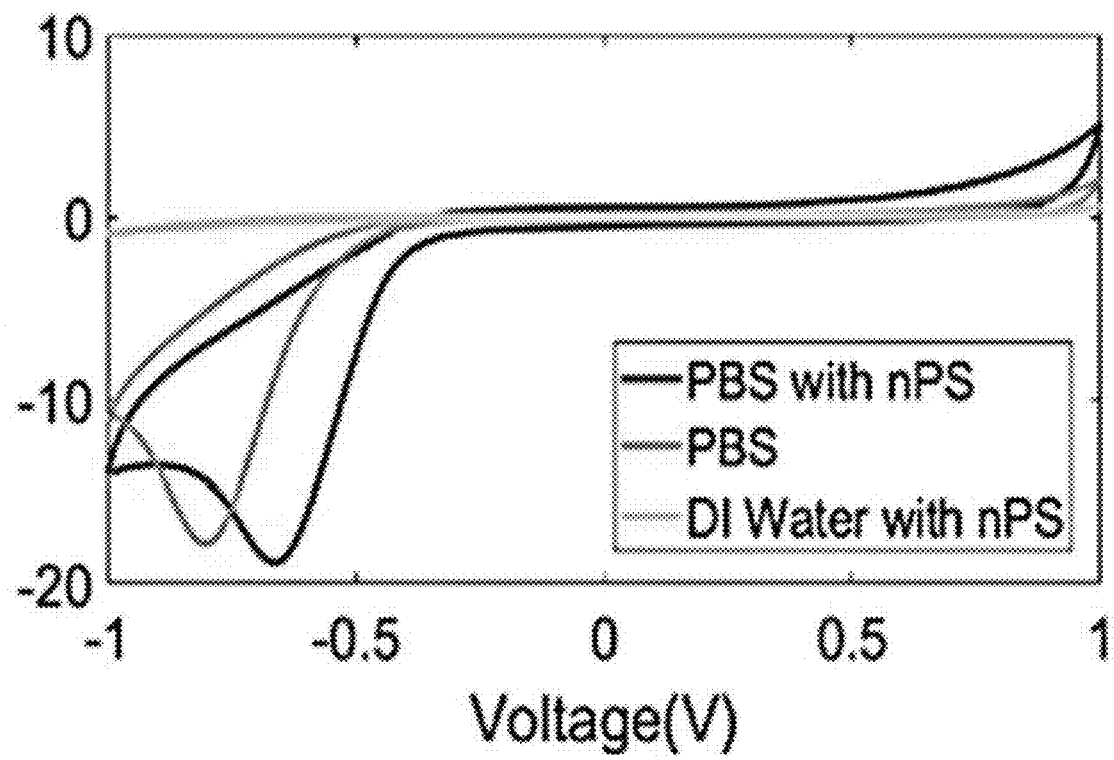
FIG. 3A is a plot illustrating the cyclic voltammetry curve obtained from −1 V to 1 V potential range and scan rate of 50 mV/s measuring the electrochemical response of water and PBS in the presence and absence of 100 nm diameter polystyrene, according to an embodiment of the present disclosure.
Figure 3B:
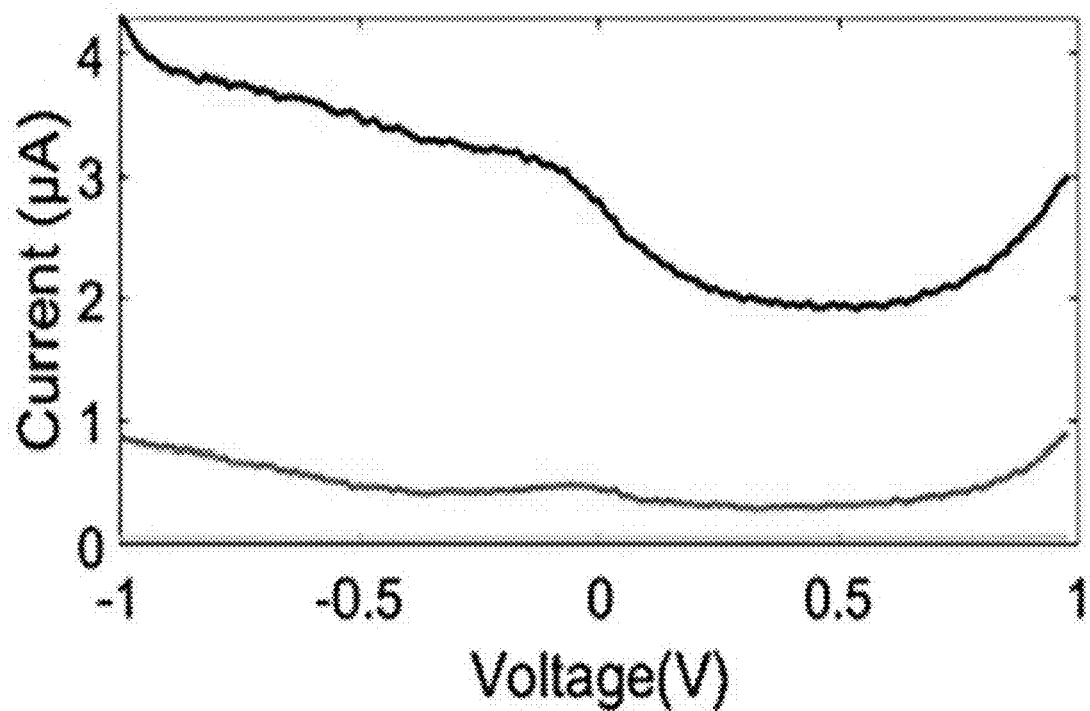
FIG. 3B is a plot illustrating the differential pulse voltammetry curve measuring the electrochemical response of water and PBS in the presence and absence of 100 nm sized nPS, according to an embodiment of the present disclosure.

Before beginning the tests and manufacturing the MIP-based sensor, it is necessary to determine the electrochemical response of 100 and 500 nm sized PS i.e., nPS in DI water and PBS, as performed using CV and DPV (See FIG. 3A-3B). It is observed that in the DI water samples, there is no discernible signal while the PBS solutions have elevated signals due to the presence of ions which might be due to the radicalization of PS in applying voltage. In the CV, the peak shifts and its magnitude increases when the nPS is present on the electrode. The signal increase is even more apparent in the DPV data, where the test including nPS has a signal which is approximately 4 times that of the PBS without any plastic. This data points towards nPS oxidizing in the presence of a potential difference and electrolyte solution.

Figure 3C:
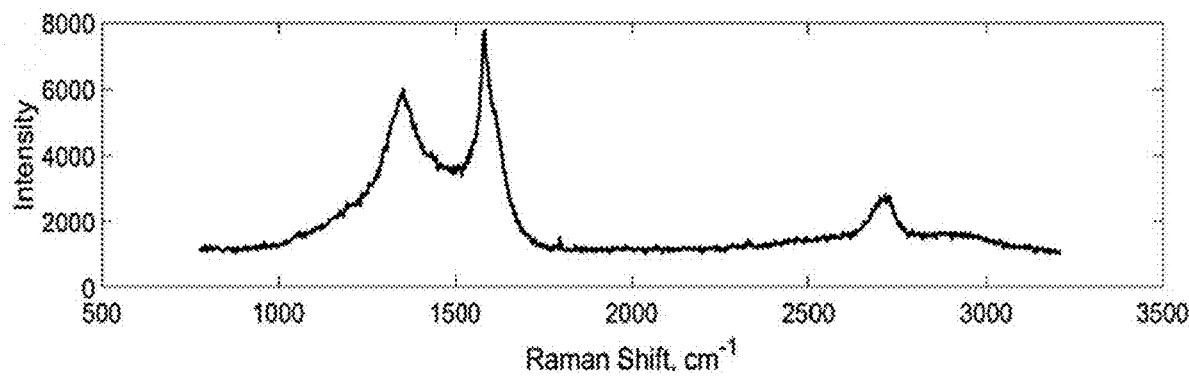
FIG. 3C is a plot illustrating the Rama Spectrum of the bare SPCE before initiating the MIP@PoPD/SPEC-based sensing electrodes, according to an embodiment of the present disclosure.

In this work, nPS sensing is based on the electrical response of the MIP@PoPD/SPCE electrode. Therefore, it is advisable to have an idea about the surface properties of SPCE and further changes during MIP fabrication and further sensing. In this direction, Raman spectroscopic techniques have been adopted as a characterization approach at every stage of SPCE modification. The surface functionality of bare working SPCE was examined using Raman spectroscopy (See FIG. 3C) and all the observed Raman bands are associated with the Raman frequencies of carbon. Raman spectroscopy is known to be very sensitive to symmetric covalent bonds (including C—C bonds). Therefore, the information related to a C—C arrangement in carbon materials like diamond, fullerenes, graphene, graphite, and single-walled carbon nanotubes can be gathered by analyzing Raman Spectroscopy of carbon materials. The Raman spectrum of a screen-printed carbon electrode, adopted for fabricated MIP-based sensor, is shown in FIG. 3C. The Raman band at ~1250 $cm^{-1}$ is attributed to the D-band (hybridized vibrational mode, and ring breathing mode related to $sp^2$ carbon ring) of the carbon, and a band at 1650 $cm^{-1}$ is associated with the G-band of carbon material. The D-band present in the carbon indicates some disorder. The G-band is associated with the vibrational frequency of the tetrahedral $sp^3$ bond in the carbon material. The vibrational band at 2750 $cm^{-1}$ is related to the G' (2D) band associated with the C—C layered structure (interaction among stacked graphene layers) in graphite.

Figure 4A:
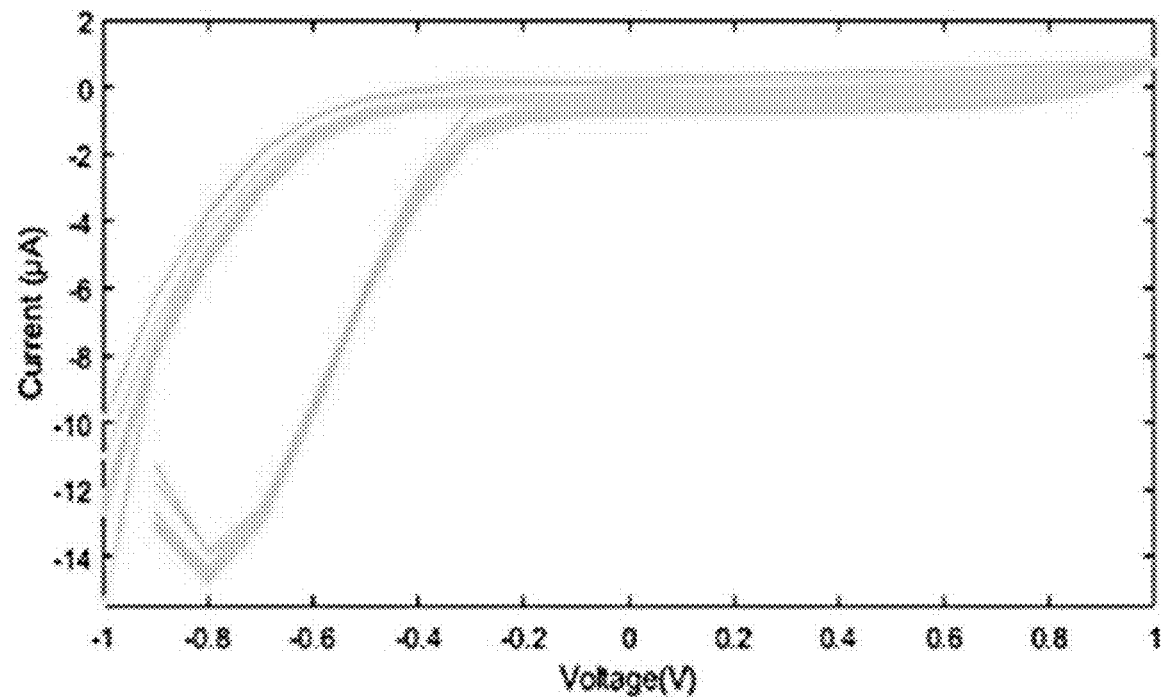
FIG. 4A is a plot illustrating the cyclic voltammetry measurement during the cleaning process, according to an embodiment of the present disclosure.
Figure 4B:
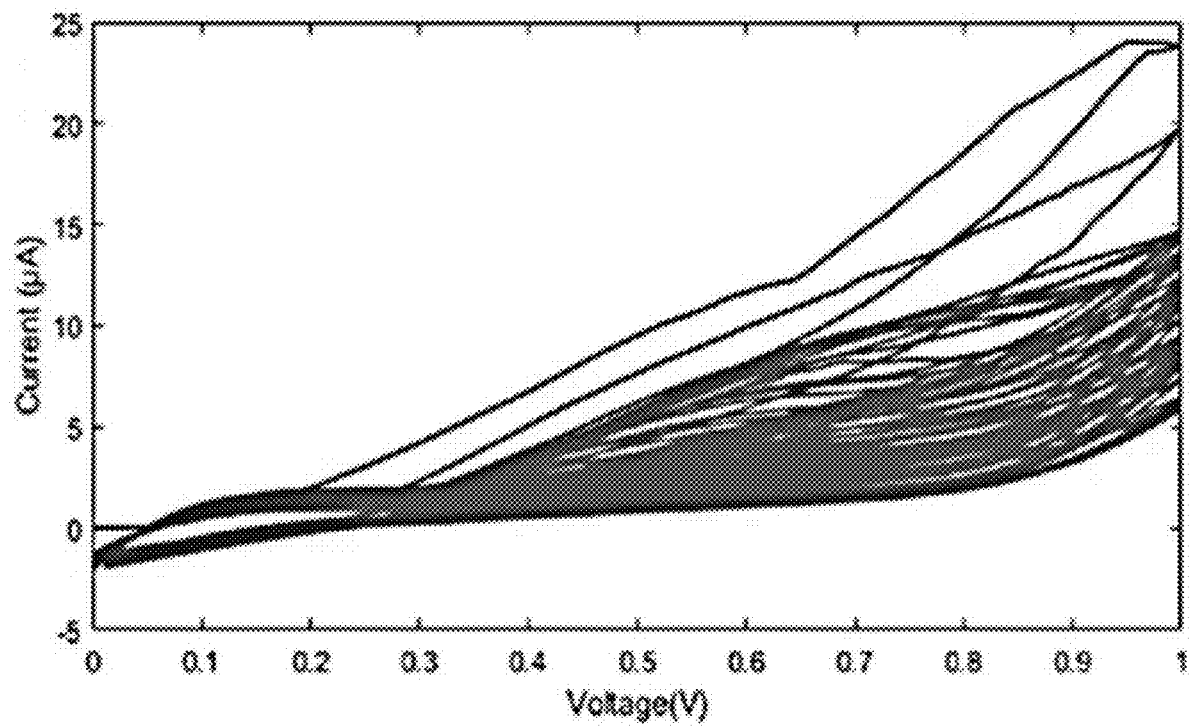
FIG. 4B is a plot illustrating the cyclic voltammetry measurements of electro-polymerization, according to an embodiment of the present disclosure.
Figure 4C:
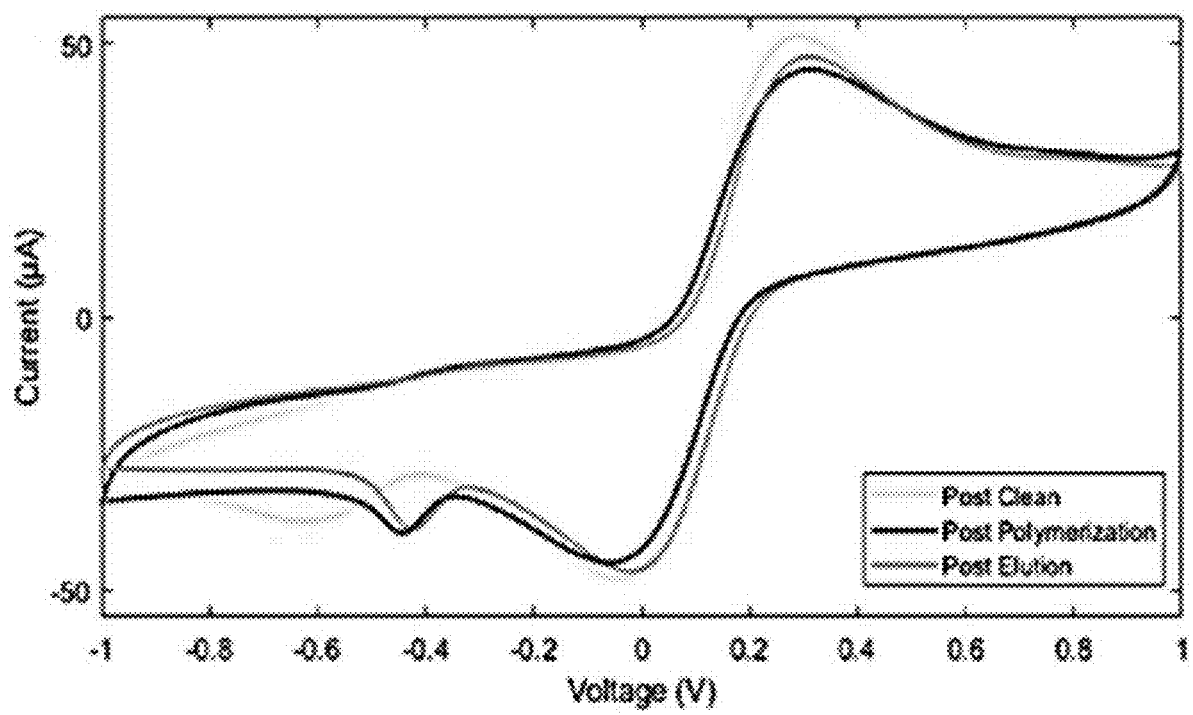
FIG. 4C is a plot illustrating the cyclic voltammetry scans measured for the characterization of MIP@POPS sensor response post-elution, according to an embodiment of the present disclosure.
Figure 4D:
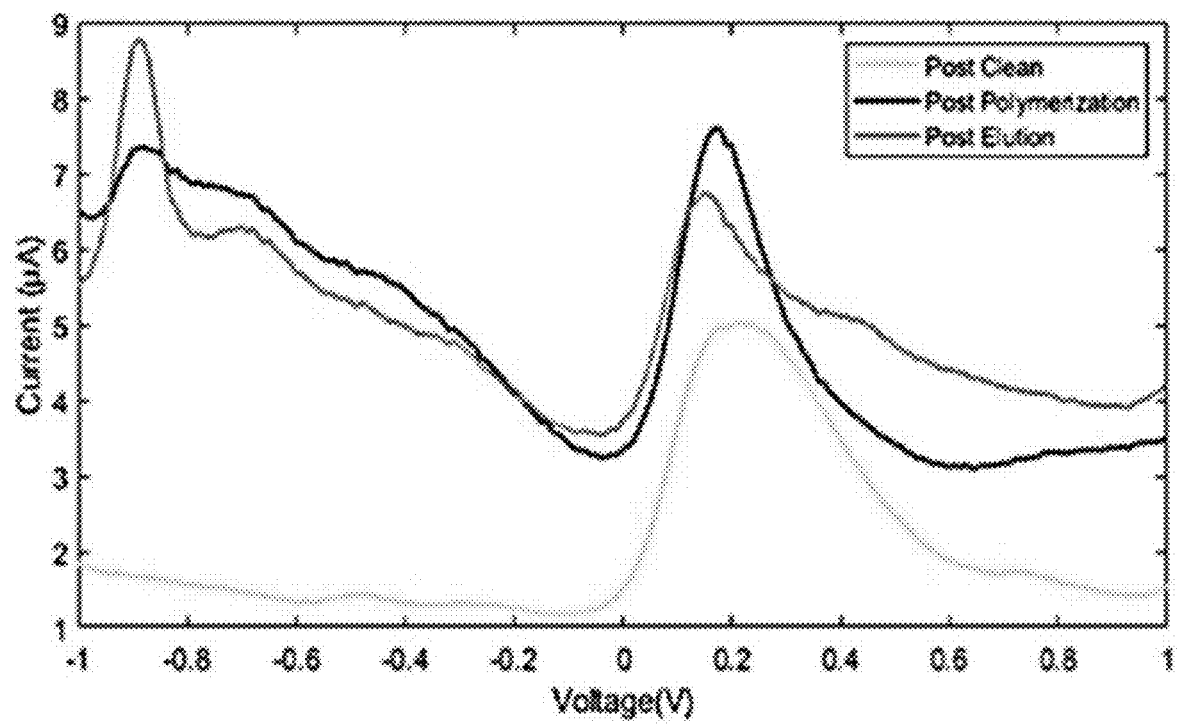
FIG. 4D is a plot illustrating the differential pulse voltammetry measured for the characterization of MIP@POPS sensor response post-elution, polymerization, and cleaning, according to an embodiment of the present disclosure.

Once the surface functional characteristics of SPCE are explored well, all SPCE were processed for MIP@PoPD fabrication using electrochemical techniques. All the MIP@PoPD/SPCE were fabricated using an identical polymerization solution, diluted samples, cleaning solution, and electrolyte solution. FIGS. 4A-4B display the cleaning and polymerization process, respectively, of the sensor as well as the resulting CV and DPV data at every step of the manufacturing process, FIGS. 4C-4D. This processing and the subsequent voltammograms were consistent across all sensors tested. Cleaning is done to ensure that the electrode being functionalized is clear of contaminants and has a smoother surface. For this, hydrochloric acid is pipetted onto the electrode alongside 10 sweeps from −1 V to 1 V at a scan rate of 100 mV/s, FIG. 4A. For the polymerization process, 100 μL of the polymerization solution is pipetted onto the electrode followed by cyclic voltammetry from 0 V to 1 V at 50 mV/s for 30 cycles, FIG. 4B. The following data was collected using 500 nm polystyrene as the template.

The fabrication of the proposed MIP-based sensor is a systematic process that involves significant surface modification. It is essential to explore that 1) oPD polymerizes to PoPD, 2) the polymerization of POPD in the presence of PS, and 3) the removal of PS from the PoPD surface to make a specific MIP. All these changes are also expected and are explored using Raman spectroscopy (See FIG. 4A-4D). Both the PoPD and PS peaks are consistent with previous works. It is to be noted that all scans containing PoPD had fluorescence, which was corrected through the use of a polynomial fitting of the resulting data.

Figure 5A:
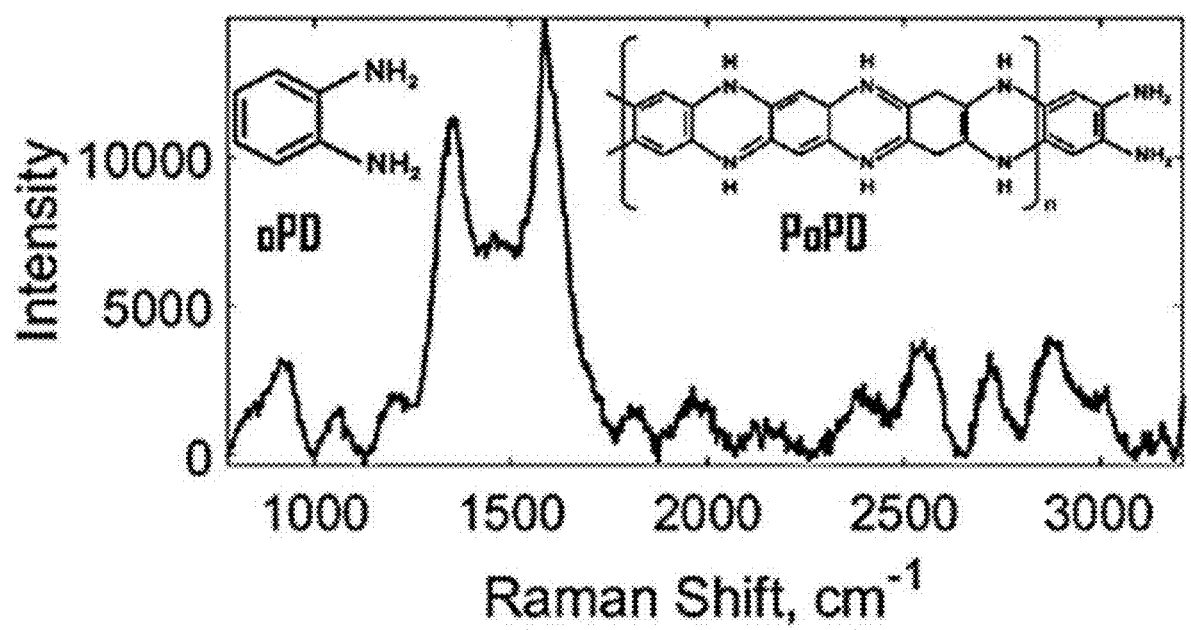
FIG. 5A is a plot illustrating the spectra of the PoPD electrode after polymerization, according to an embodiment of the present disclosure.

In the Raman spectrum of POPD (See FIG. 5A), all the observed frequency bands are related to the functional groups present in the structure of POPD. For example, the peaks at 1050 $cm^{-1}$ and 1100 $cm^{-1}$ are related to the —C—H stretching and bending frequencies associated with the benzenoid ring structure. The presence of C—N stretching vibrational frequencies is confirmed by the presence of a band at 1250 $cm^{-1}$. The presence of >C—N stretching frequency of quinoid units and the quinoxaline ring stretching vibrations are associated with the bands observed in the region of 1350 to 1400 $cm^{-1}$. The bands present at 1450 $cm^{-1}$ and 1550 $cm^{-1}$ are related to the —C—N stretching vibration in the quinoid ring and the —C—C-stretching vibration in the aromatic ring unit. The bands present in the region from 2600 $cm^{-1}$ to 3000 $cm^{-1}$ are associated with vibrational bands in C—H and =C—H, which might be related to the C—C system of PoPD. After a careful analysis, it is confirmed that the Raman vibrational bands confirmed the fabrication of PoPD on SPCE via electro-polymerization.

Figure 5B:
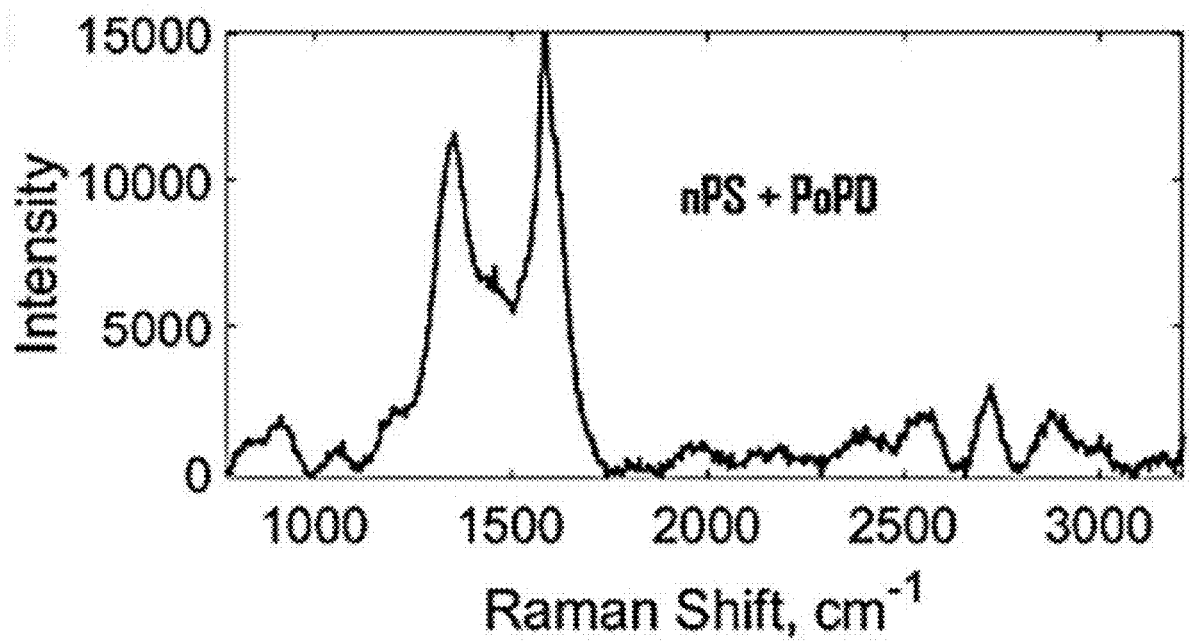
FIG. 5B is a plot illustrating the spectra of the PoPD+nPS electrode after polymerization, according to an embodiment of the present disclosure.
Figure 5C:
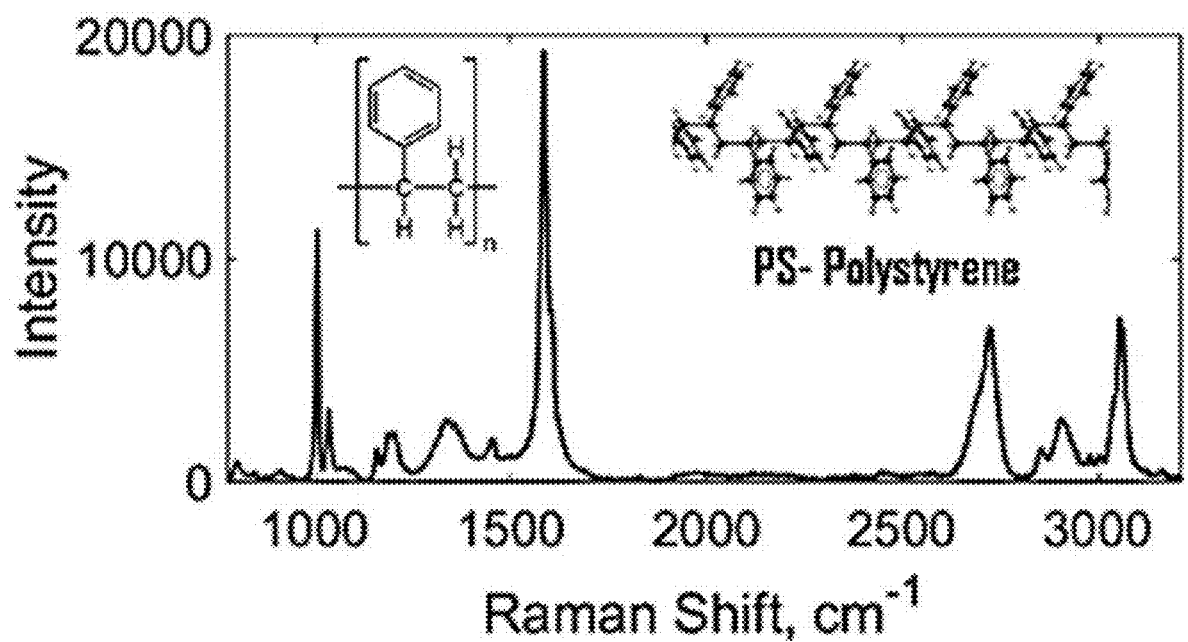
FIG. 5C is a plot illustrating the spectra of nPS detected on the sensor, according to an embodiment of the present disclosure.

Electro-polymerization of POPD in the presence of nPS is an essential step to fabricate MIP@PoPD, designed for nPS detection. To evaluate this step, the Raman spectrum of PoPD-nPS was recorded (See FIG. 5B). It is observed that all the Raman bands in this spectrum match the bands observed in the Raman spectrum of POPD. However, some of the bands are shifted due to a close matching of functional groups present of POPD and nPS. For a better idea, the Raman spectrum of nPS were recorded (See FIG. 5C) tracked on the MIP@PoPD surface using Raman microscopy mapping.

In the Raman spectrum of nPS, the confirmation of C—H vibrations of PS (at high frequency) is confirmed due to the peaks present at 2800 $cm^{-1}$ and 3000 $cm^{-1}$. The low-frequency carbon-carbon (C—C) vibrations are at around 800 $cm^{-1}$. The C—H vibrations have a higher frequency than the C—C vibrations because hydrogen is lighter than carbon. Similarly, the vibrations of two carbon atoms linked by strong double bonds (C=C) at around 1600 $cm^{-1}$ (ring-skeletal stretch) can be seen. The low-intensity band at 620 cm 1 is attributed to ring deformation mode and the peak at 1400 $cm^{-1}$ is associated with the $CH_2$ scissoring. Noticeably, the Raman band at 1000 $cm^{-1}$ is related to the expanding and contracting breathing mode of an aromatic C-ring which is related to polystyrene in this case, especially related to polymer colloid-type particles.

Figure 5D:
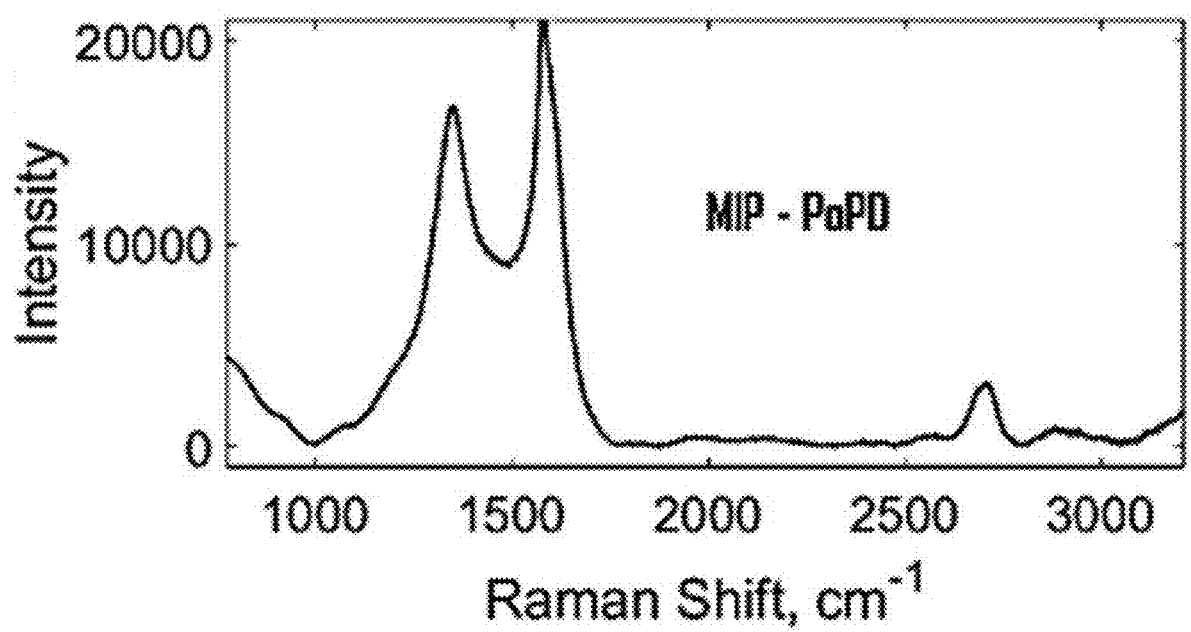
FIG. 5D is a plot illustrating the spectra of MIP@PoPD against nPS, according to an embodiment of the present disclosure.

The nature of the MIP@PoPD/SPEC electrode to capture was also evaluated by the Raman spectroscopy (See FIG. 5D). The nPS utilized to evaluate the sensing performance was a low concentration and the volume of the sample was 10 μL. It is expected to see the Raman band peaks position related to PoPD and nPS, but the observed bands (See FIG. 5D) are not conclusive, which might be due to a low concentration of nPS and might be due to the overlapping of bands between oPD and nPS. Additionally, the open pores and open surface of SPCE might be reasons to obtain bands related to the D and G bands of carbon materials.

Figure 6A:
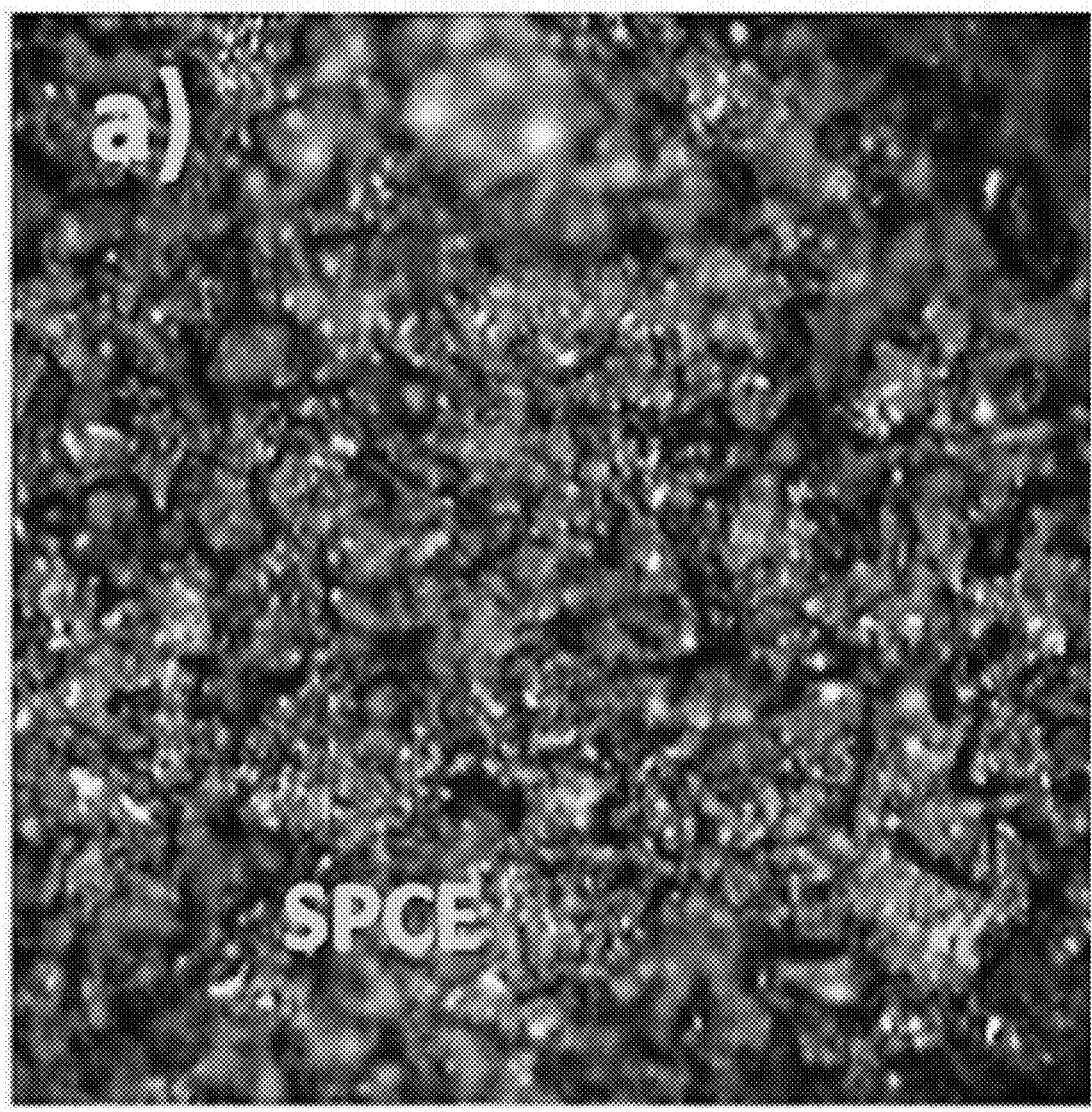
FIG. 6A is a microscopic image (μm) of the bare screen-printed carbon electrode, according to an embodiment of the present disclosure.
Figure 6B:
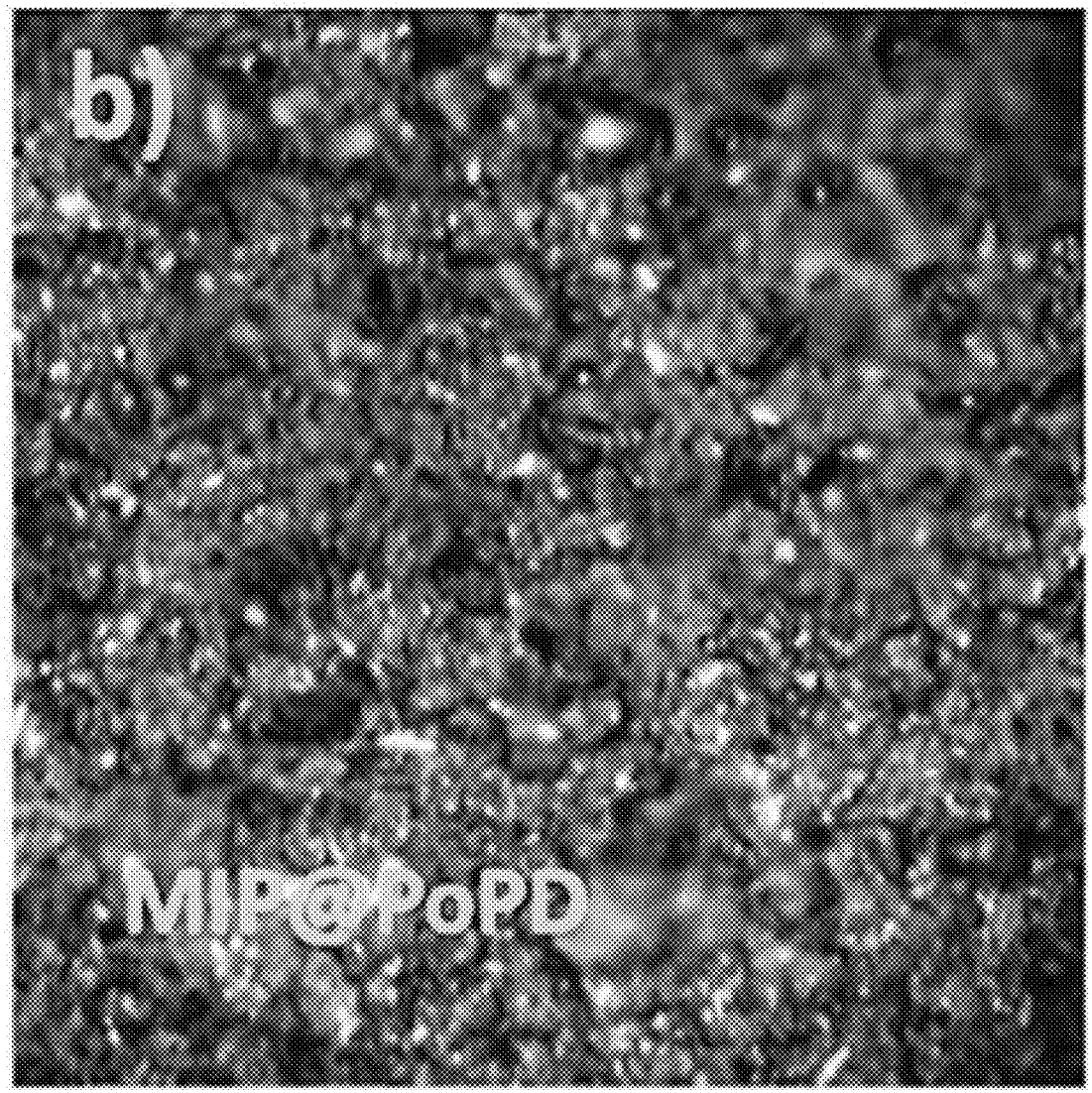
FIG. 6B is a microscopic image (μm) of the SPCE with the MIP@PoPD superposed onto the SPCE, according to an embodiment of the present disclosure.
Figure 6C:
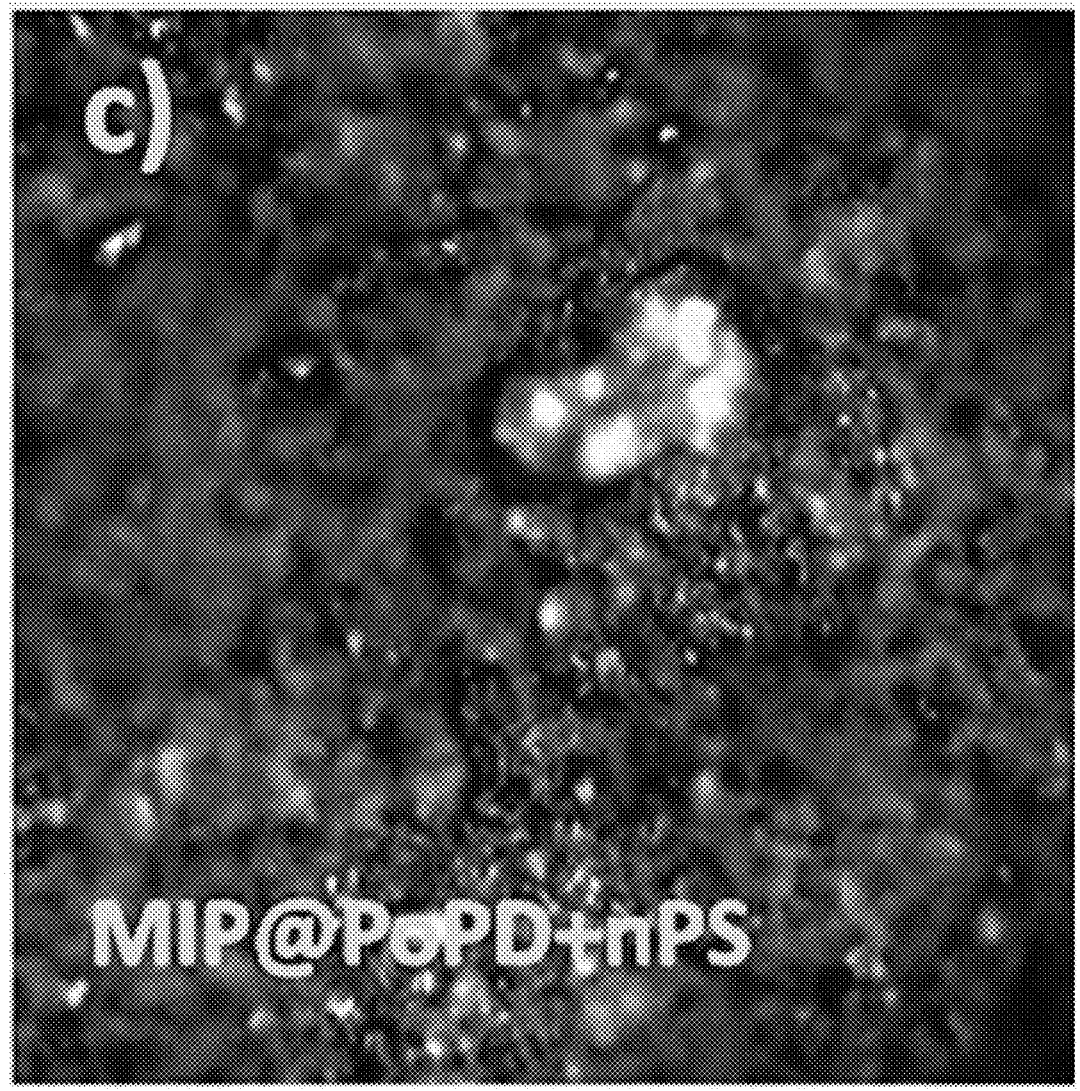
FIG. 6C is a microscopic image (μm) of the SPCE with the MIP@PoPD superposed onto the SPCE evaluating the adsorption of nPS at various spots, according to an embodiment of the present disclosure.
Figure 6D:
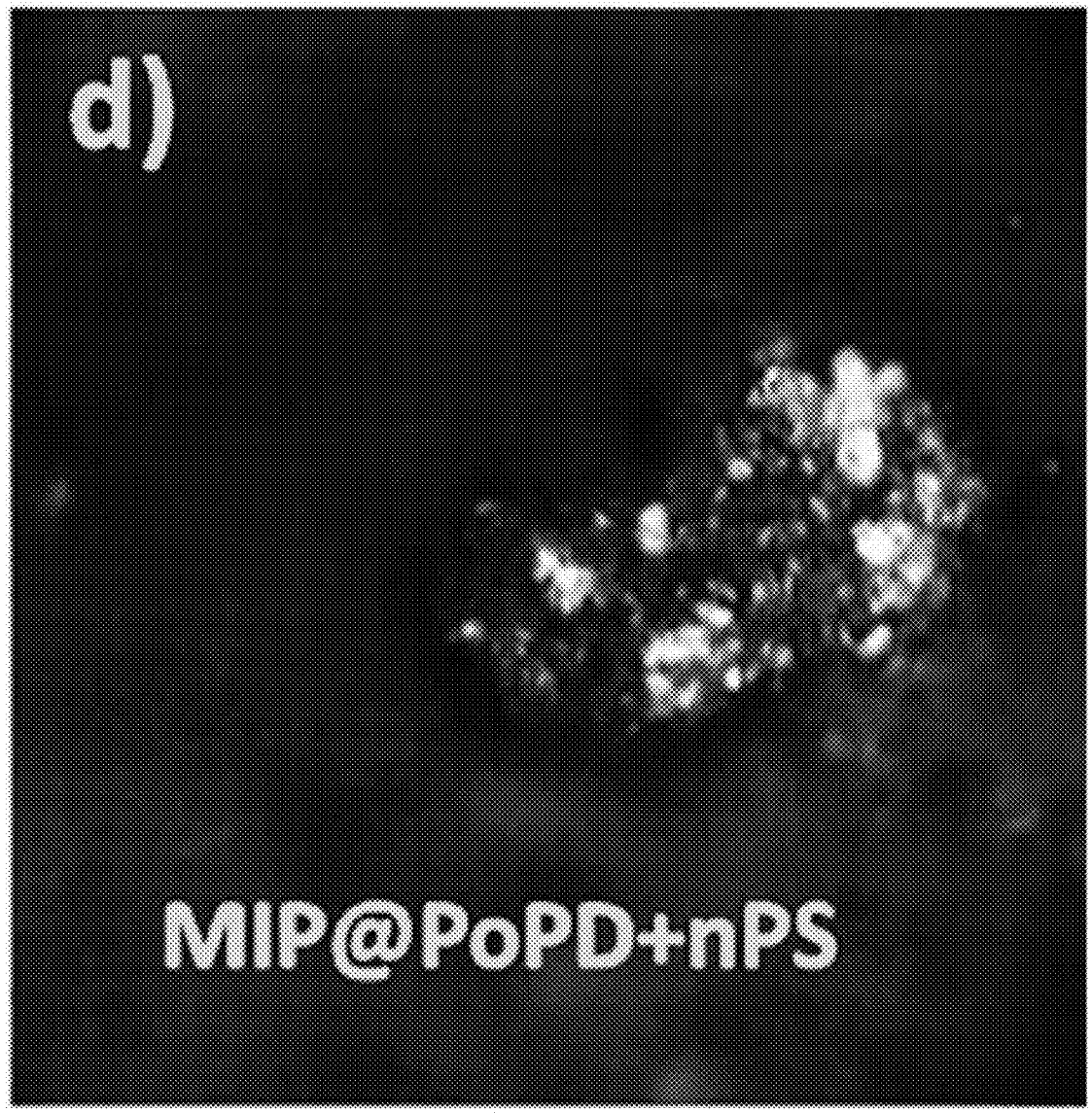
FIG. 6D is a microscopic image (μm) of the SPCE with the MIP@PoPD superposed onto the SPCE evaluating the adsorption of nPS at various spots, according to an embodiment of the present disclosure.

It was very important to perform a surface profiling before recording the Raman spectrum for the visual inspection of the surface. In this research, Raman microscopy was utilized to evaluate the changes in the SPCE during the stepwise fabrication of the sensor and sensing of nPS. It is observed that carbon is well-distributed uniformly throughout the surface in the form of a granular morphology (See FIG. 6A). A noticeable change in the morphology of MIP@PoPD (See FIG. 6B) is observed in comparison to the morphology of SPCE. The appearance of some illuminating components is attributed to the fluorescence nature of POPD. This feature confirms the successful fabrication of PoPD. The objective of fabricated MIP@PoPD is to capture nPS (See FIG. 6C) and this expected trapping brings a change in the MIP@PoPD morphology. In this scenario, the illuminating nature of nPS@MIP@PoPD is attributed to the illuminating nature of nPS and this appears more intense than PoPD. Various spots of nPS@MIP@PoPD (See FIG. 6D) were mapped using the microscope and the same illuminating feature was observed in FIG. 6C.

Figure 7A:
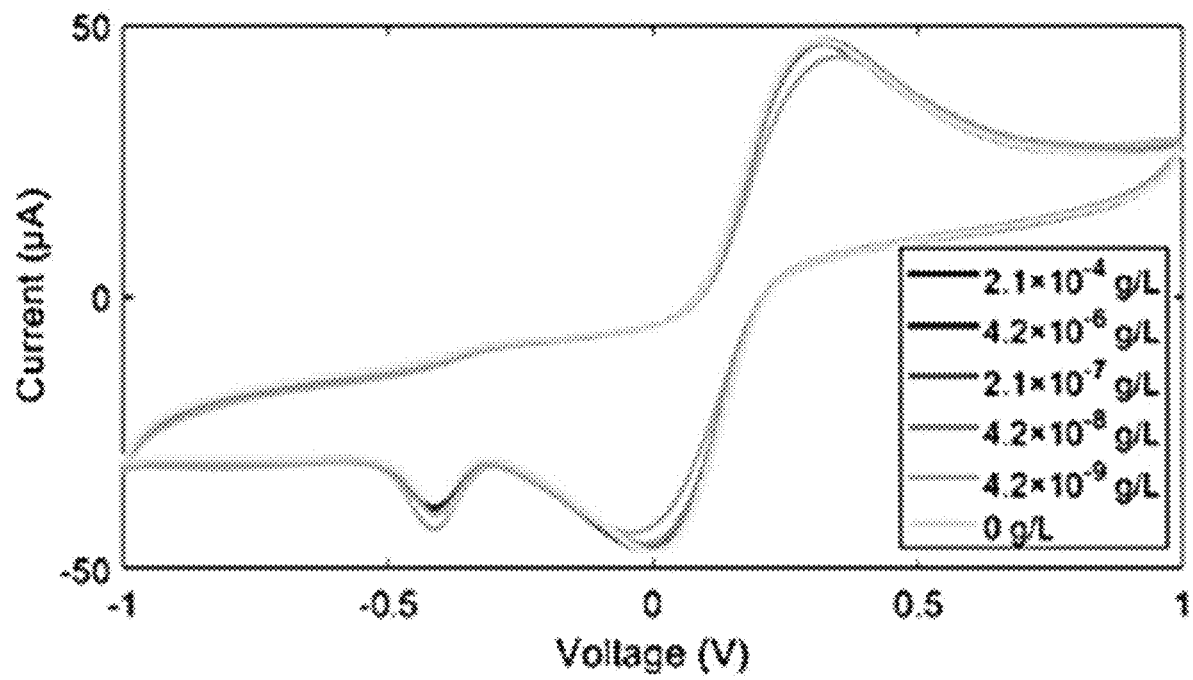
FIG. 7A is a plot illustrating the cyclic voltammetry of a single sensor subjected to successive additions using various 500 nm concentrations, according to an embodiment of the present disclosure.
Figure 7B:
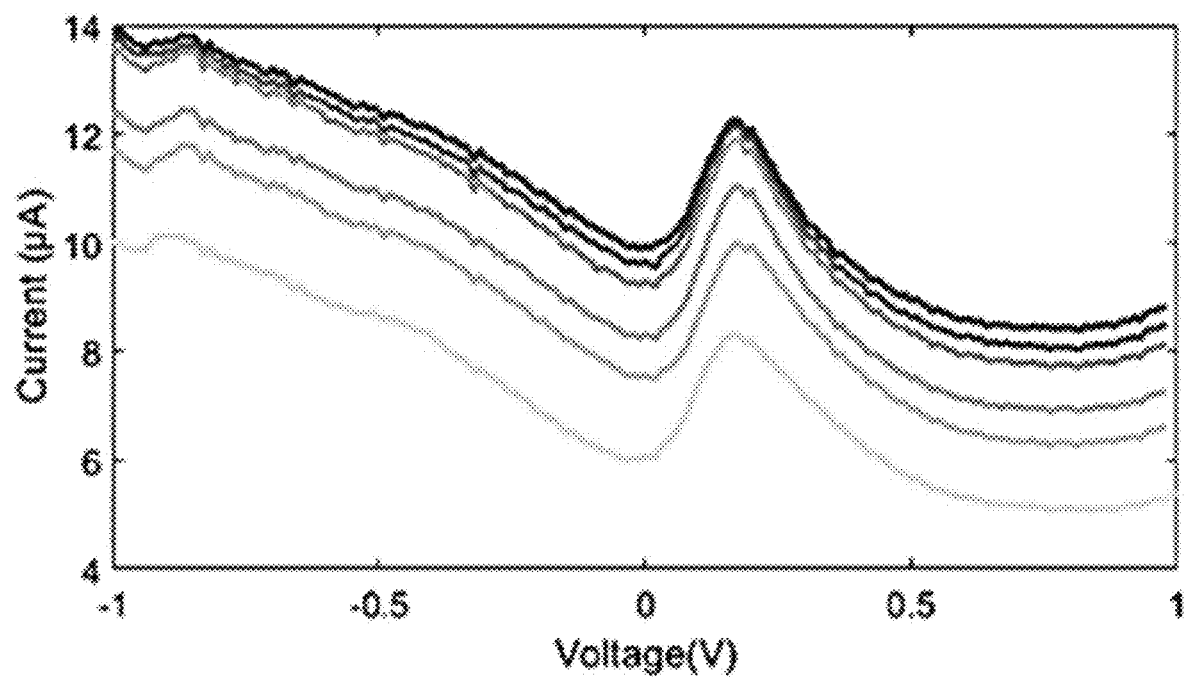
FIG. 7B is a plot illustrating the differential pulse voltammetry of a single sensor subjected to successive additions using various 500 nm concentrations, according to an embodiment of the present disclosure.

With the MIP fabricated onto the sensor's working electrode, two different scenarios were tested to determine the analyte's response. The first was successive additions, where a single sensor was fabricated and the smallest concentration of nano PS, was added, $4.2 \times 10^{-9}$ g/L, allowed to incubate for ten minutes, characterized using CV and DPV, rinsed, dried, then tested with the next highest concentration. The resulting CV and DPV data (See FIG. 7A-7B) show that as the concentration of nPS present on the sensor's surface increases, so does the output current of the sensor and its subsequent peak magnitude. In the DPV data, FIG. 6B, the sensor appears to approach saturation after being presented with $4.2 \times 10^{-7}$ g/L. It is important to note that since elution was not conducted between these trials, PS accumulated throughout, allowing for the examination of a saturated sensor.

Figure 7C:
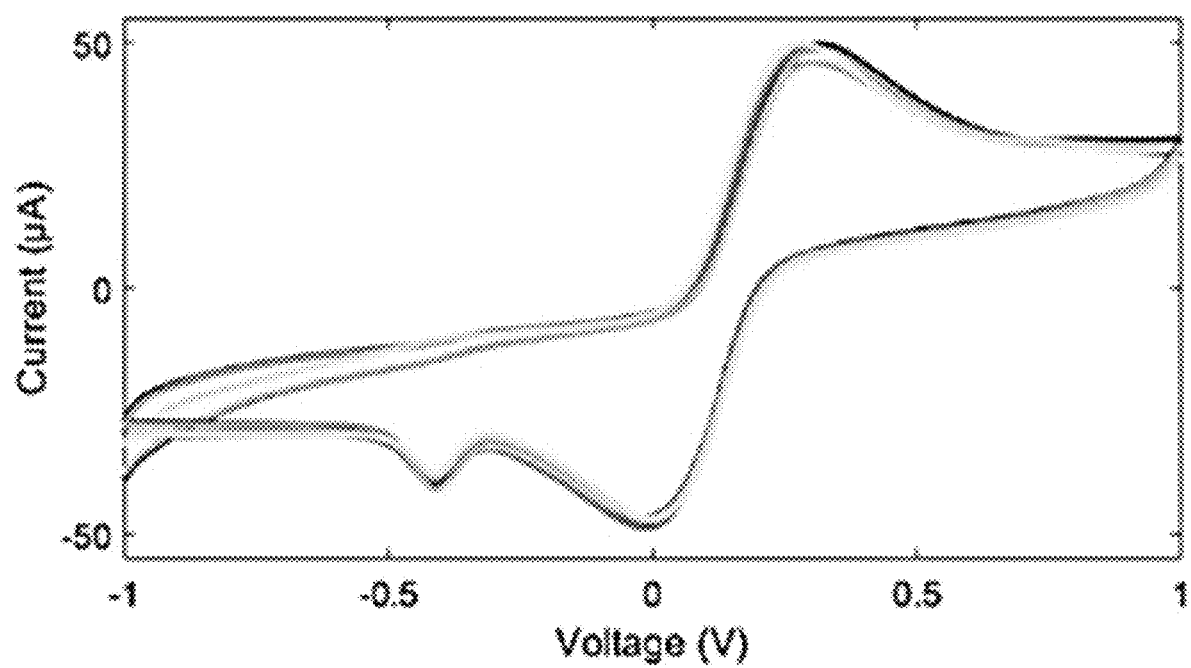
FIG. 7C is a plot illustrating the cyclic voltammetry of independently tested sensors using various 500 nm concentrations, according to an embodiment of the present disclosure.
Figure 7D:
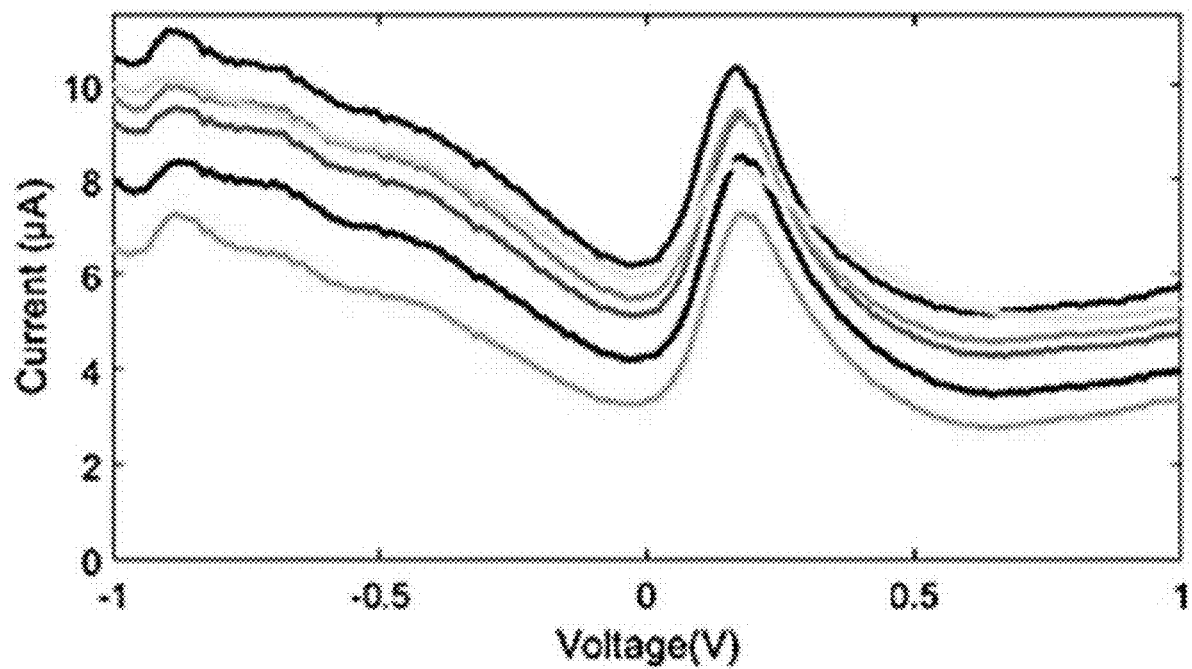
FIG. 7D is a plot illustrating the differential pulse voltammetry of independently tested sensors using various 500 nm concentrations, according to an embodiment of the present disclosure.
Figure 7E:
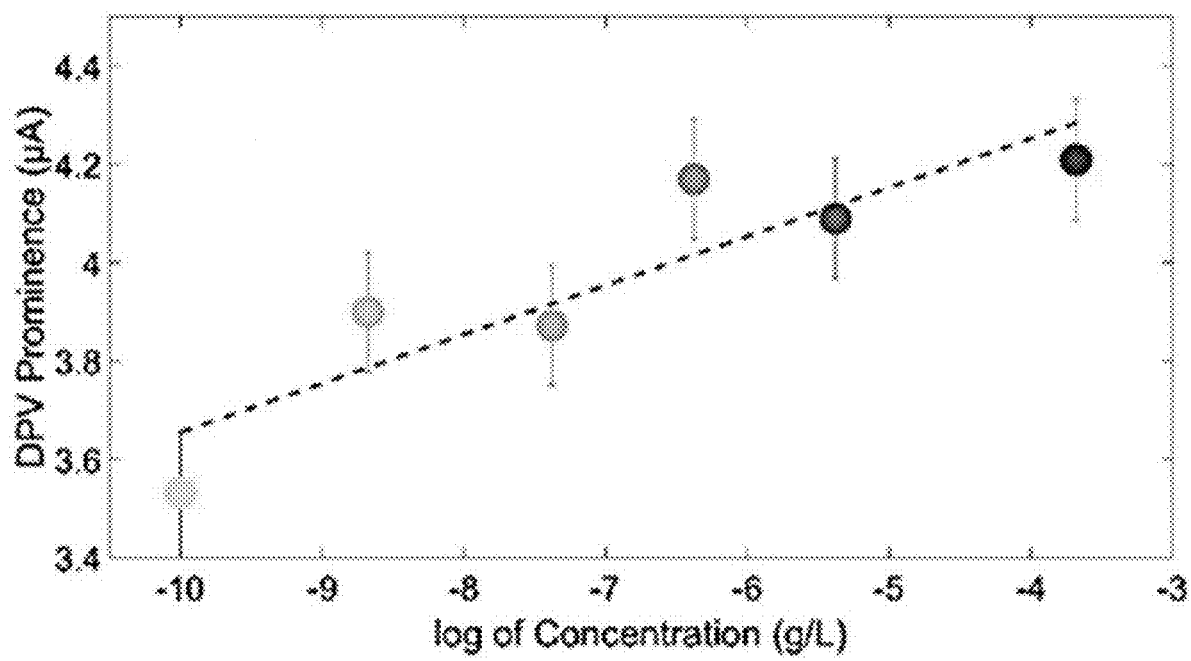
FIG. 7E is a plot illustrating the differential pulse voltammetry scan peak prominence plotted against the log of concentration with a linear regression fit, according to an embodiment of the present disclosure.

For FIGS. 7C-7D, six sensors were fabricated and presented with only a single concentration of polystyrene before testing. The resulting voltammograms of the independent sensing tests do not immediately show a clear correlation between the peak current and the concentration presented, most likely due to minor sensor-to-sensor variations that greatly impact the small-scale currents being investigated. The data can be better represented using the prominence of the DPV data, FIG. 7E. By taking the prominence, or difference between the peak and valley of the data, the effect of the minor variations between each sensor fabricated can be lessened. The DPV data presents both good fit ($R^2=0.812$) and significance (p-value<0.015), with the prominence increasing alongside the concentration of PS present on the sensor.

The calibration curve based on CV studies (data not shown) were also plotted but the data is not acceptable to consider for a sensing application.

Figure 8A:
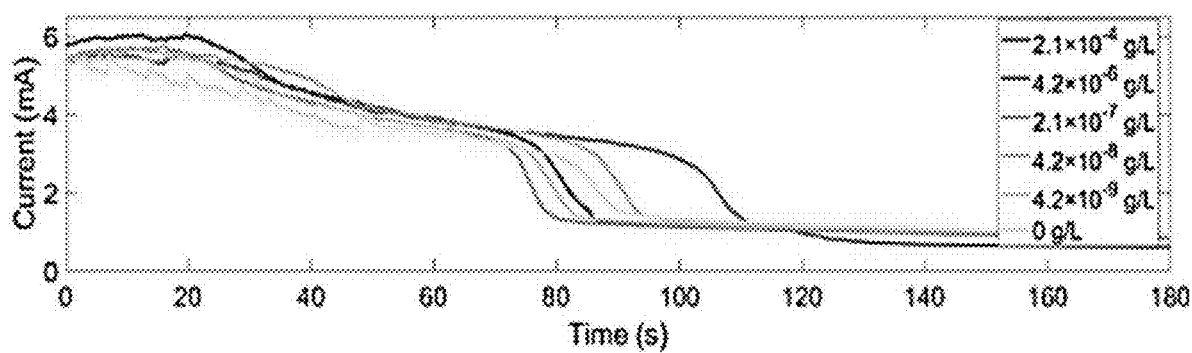
FIG. 8A is a plot illustrating chronoamperometric data for all concentration when subjected to 10V for 180 seconds, according to an embodiment of the present disclosure.
Figure 8B:
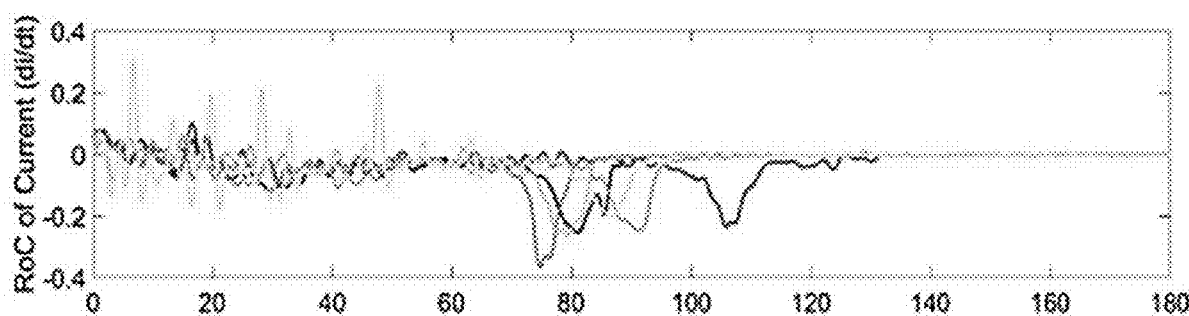
FIG. 8B is a plot illustrating the rate of change of current for all concentrations tested, according to an embodiment of the present disclosure.
Figure 8C:
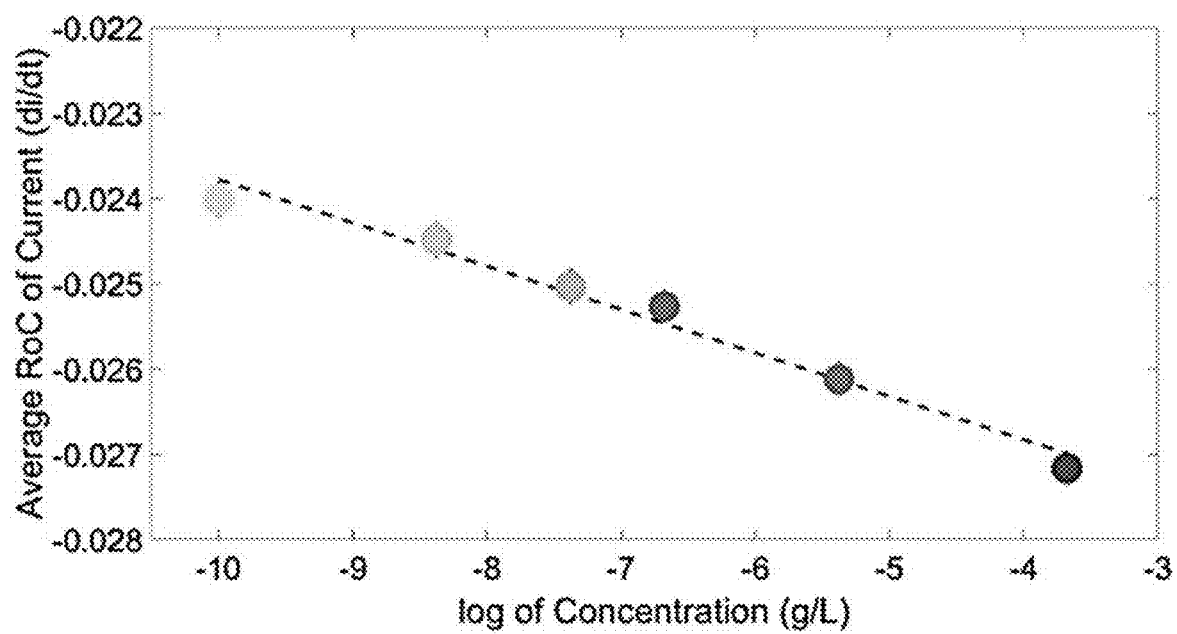
FIG. 8C is a plot illustrating the mean rate of change of current for each concentration of 500 nm tested alongside a linear regression fit, according to an embodiment of the present disclosure.

The final electrochemical technique used to characterize the sensor was chronoamperometry (CA) for 30 minutes at a constant 10 V. After 3 minutes, the current of each sensor was static, thus only the first 180 seconds were plotted and analyzed. In FIG. 8A, the current flowing through each of the sensor's electrodes steadily drops for the first 70 seconds, followed by a steep decline before the current stagnates. The rate of change of current was extracted, FIG. 8B, and cleaned up using a low pass filter. The rates of change of current for each concentration tested were averaged and plotted against the logarithm of each concentration, producing FIG. 8C. The chronoamperometric data has the most promise as a detection method, as its linear regression demonstrates both a very good fit, $R^2=0.978$, and a very high correlation between the average rate of change of the current and the concentration of nano PS present on the sensor (statistically significant at the $p<0.001$ level).

Figure 9A:
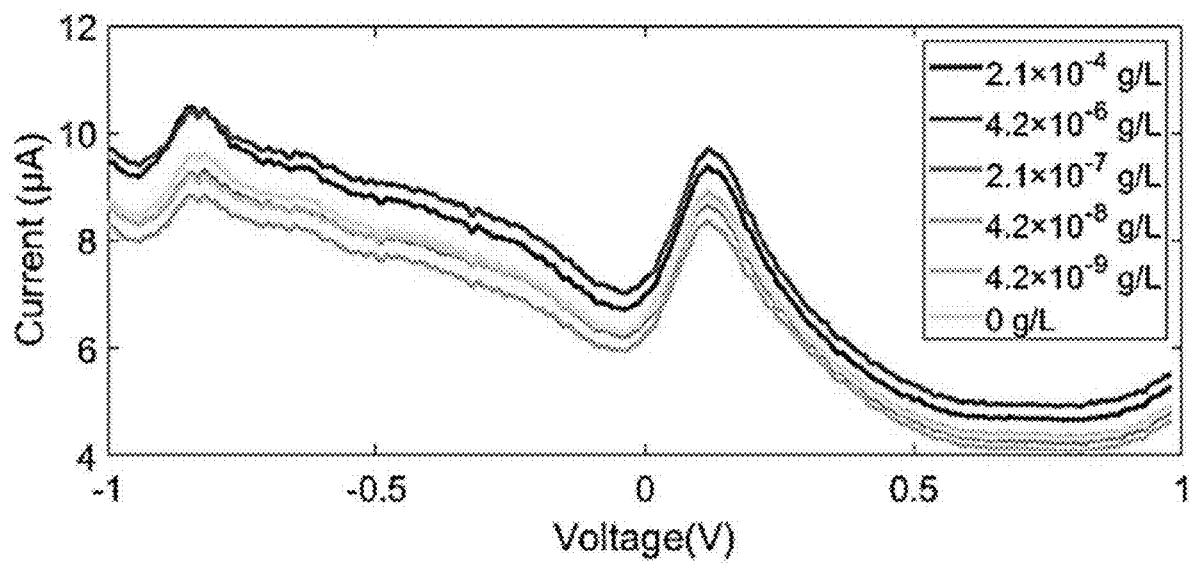
FIG. 9A is a plot illustrating the differential pulse voltammetry of a MIP@PoPD@SPCE sensor designed against 10 nm nPS template as a function of various concentrations of nPS, according to an embodiment of the present disclosure.
Figure 9B:
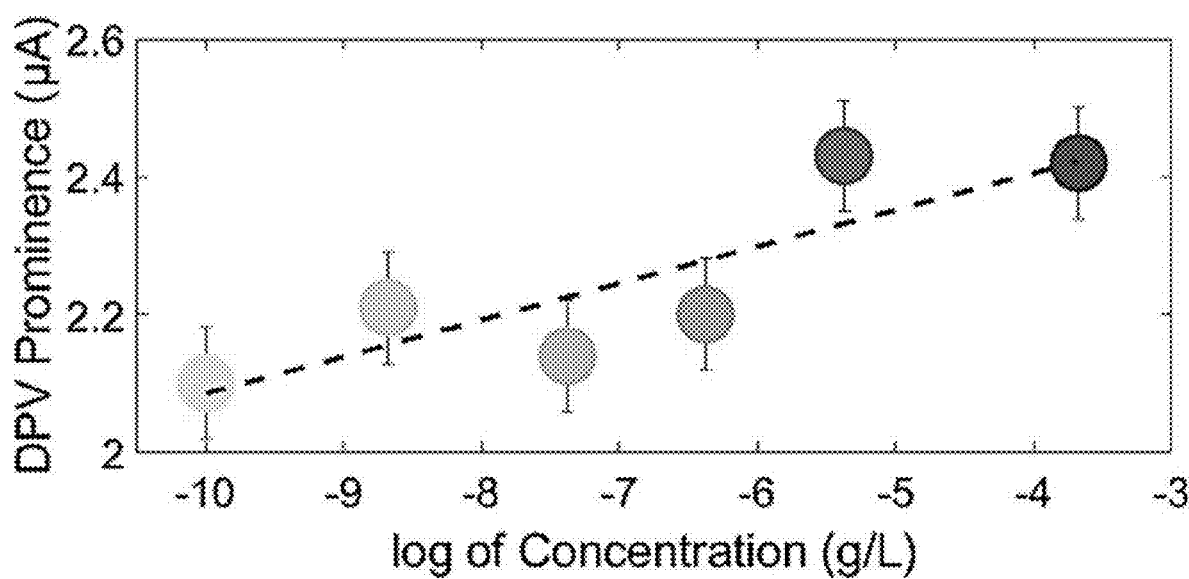
FIG. 9B is a plot illustrating a calibration curve of differential pulse voltammetry scan prominence plotted against the log of concentration with a linear regression fit, according to an embodiment of the present disclosure.

In the CA data, as the concentration of nPS increases so does the magnitude of the rate change of the current flowing through the sensor. This is believed to be due to nPS oxidizing onto the MIP@PoPD surface, where the concentration present is directly proportional to the number of electrons released and the change in current. These tests were also run using a 100 nm template. The DPV and the subsequent linear regression fit of the prominence are shown in FIGS. 9A-9B. In this data, there is again both a good fit ($R^2=0.738$) and statistical significance ($p<0.05$).

Figure 10A:
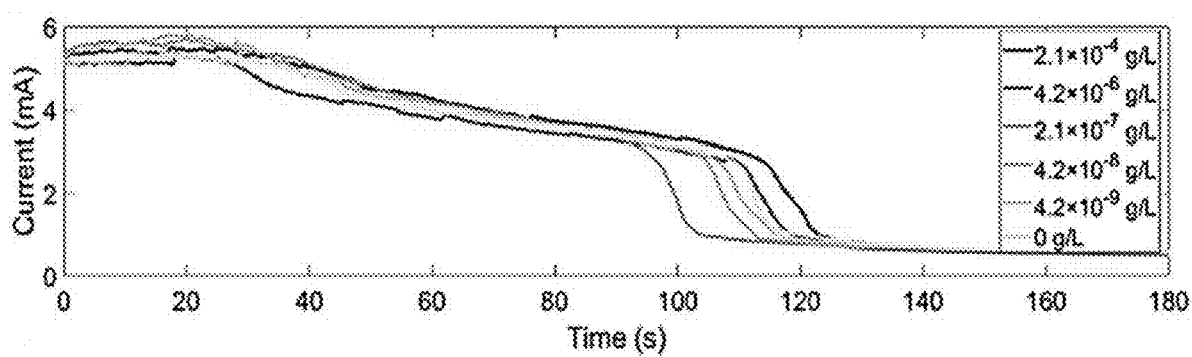
FIG. 10A is a plot illustrating chronoamperometric data for all concentration when subjected to 10 V for 180 seconds, according to an embodiment of the present disclosure.
Figure 10B:
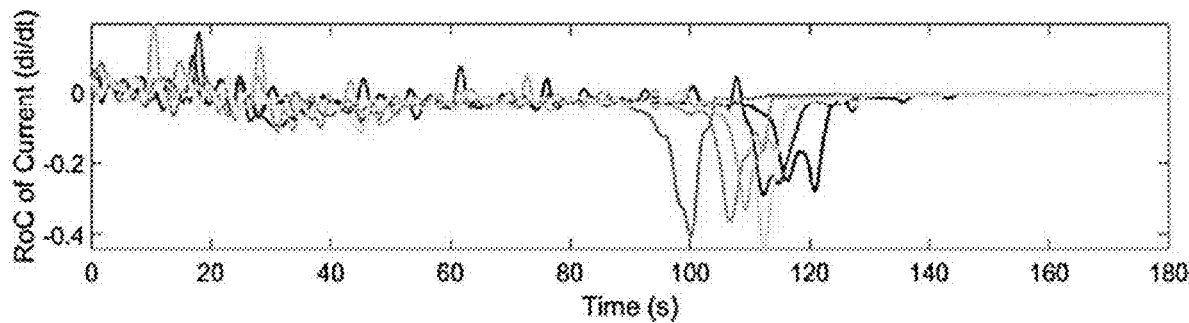
FIG. 10B is a plot illustrating chronoamperometric data rate of change of current for all concentrations tested, according to an embodiment of the present disclosure.
Figure 10C:
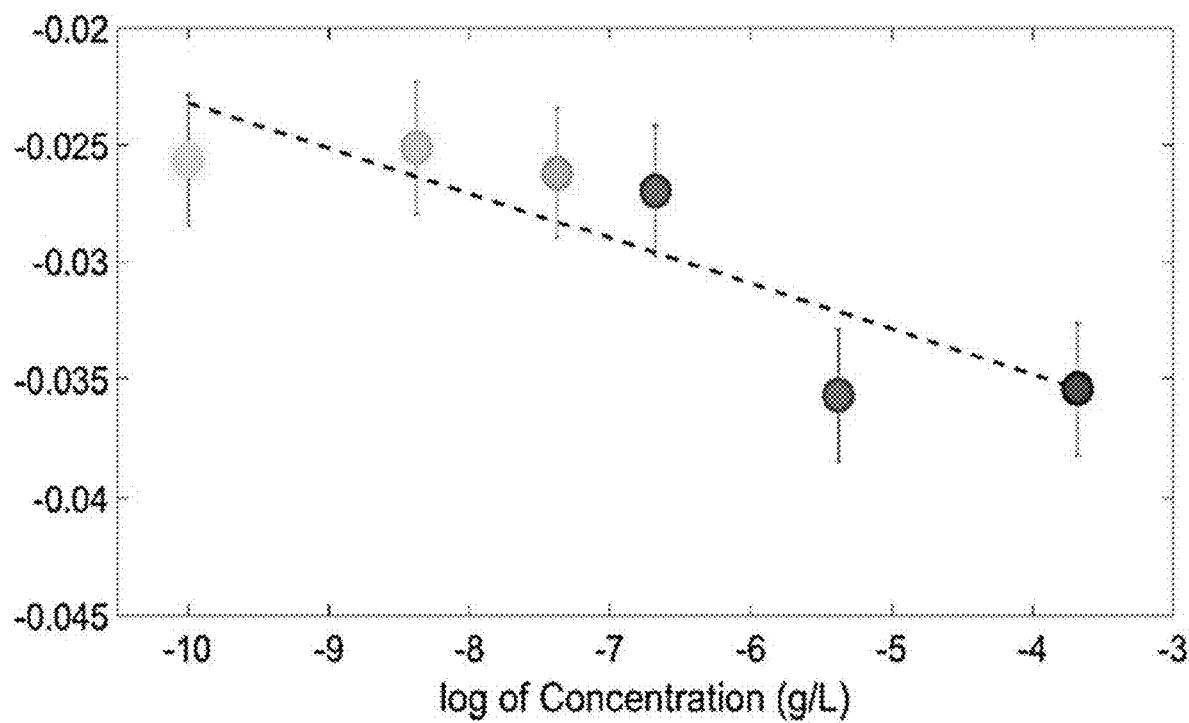
FIG. 10C is a plot illustrating chronoamperometric data and the mean rate of change of current for each concentration of 100 nm tested alongside a linear regression fit, according to an embodiment of the present disclosure.

The CA data was also recorded using the 100 nm template, FIGS. 10A-10C, and adapted onto a linear regression fit between the current's average rate of change and the concentration of PS present on the sensor, FIG. 10C. This data also shows good fit ($R^2=0.746$) and correlation (p-value<0.05) and a similar increase in the magnitude of the rate of change of the current proportional to the concentration presented.

Figure 11A:
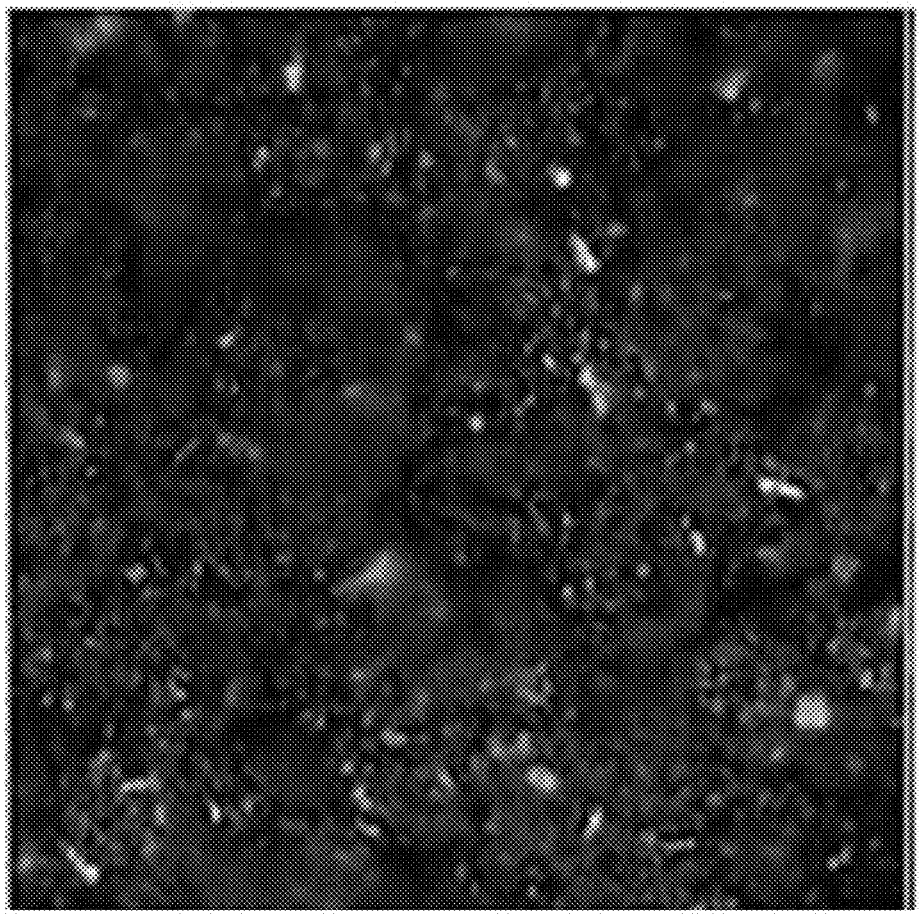
FIG. 11A is a microscopic image (μm) of the MIP@PoPD@SPCE electrode surface after exposure to lake water, according to an embodiment of the present disclosure.
Figure 11B:
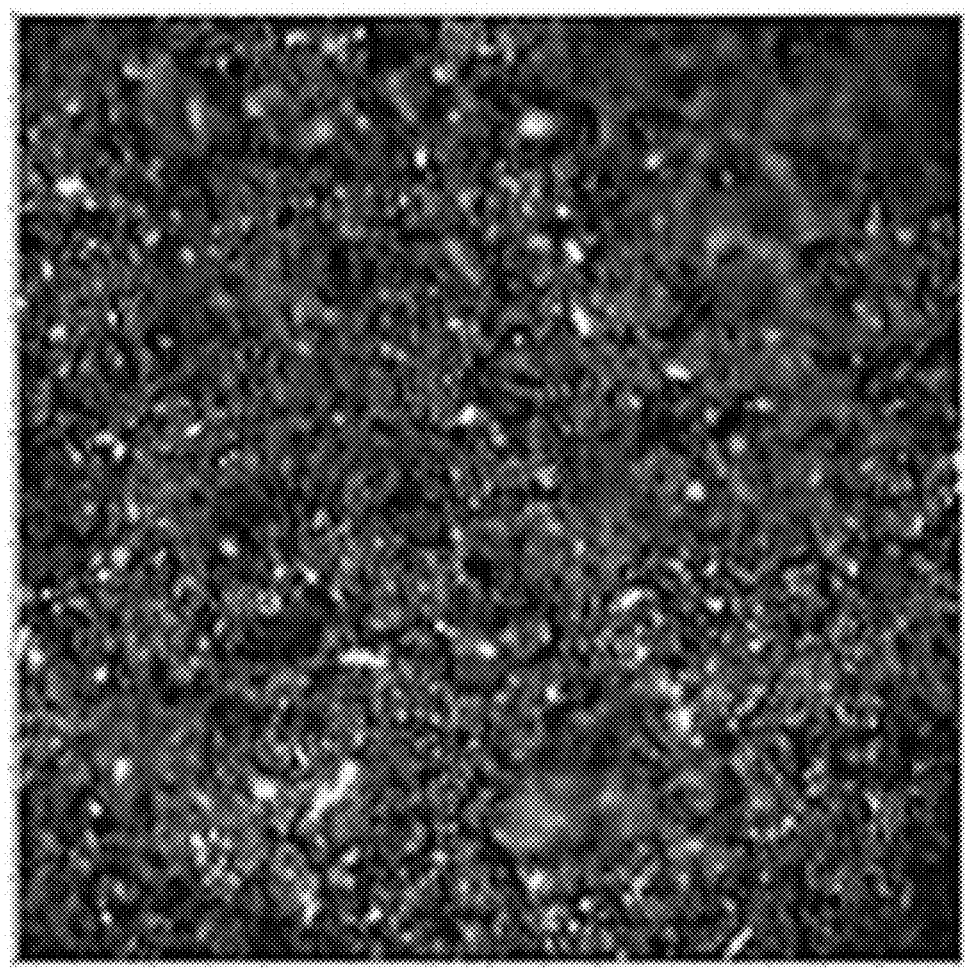
FIG. 11B is a microscopic image (μm) of the MIP@PoPD@SPCE electrode surface after exposure to lake water, according to an embodiment of the present disclosure.
Figure 12:
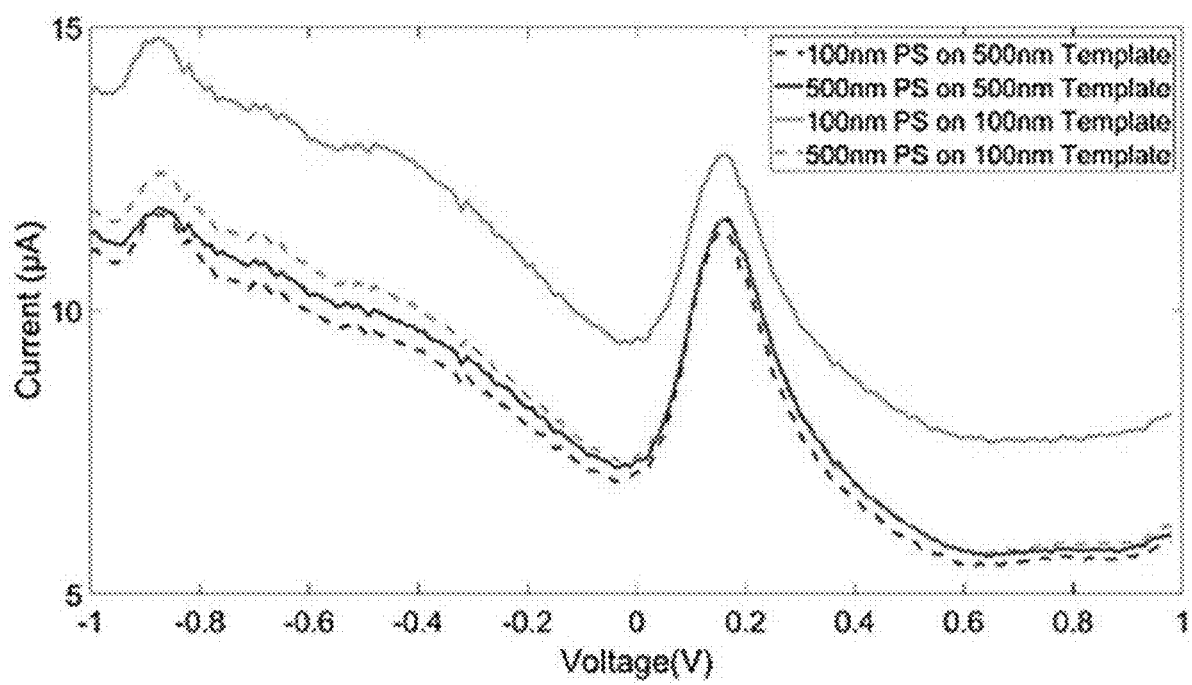
FIG. 12 is a plot illustrating differential pulse voltammetry studies for selectivity testing using various 550 nm and 100 nm sized PS templates, according to an embodiment of the present disclosure.

Consistently, throughout all trials using both 100 nm and 500 nm PS spheres, it is apparent that the concentration present is correlated to an increase in electric activity, either through the increase in current for DPV tests or increased rate of change of current for chronoamperometric tests. The next steps were to test for selectivity of the MIP-based sensor against different diameter nPS particles. When testing for selectivity between different diameter polystyrenes, two MIP matrices were manufactured; 100 nm PS template and 500 nm PS template. The subsequent sensors (See FIGS. 11A-11B) were tested against $2.1 \times 10^4$ g/L of 100 nm and 500 nm. The differential pulse voltammograms can be seen in FIG. 12.

The difference in prominence between the samples on the 500 nm template was 0.02% whilst the difference in prominence of the 100 nm templates was 20.5%. It appears that when using the 500 nm template, smaller diameter nanoparticles can also be caught and bound to the cavities formed in the MIP@PoPD, leading to a nearly identical signal. Meanwhile, using a smaller template impedes the ability of larger particles to bind and stay on the MIP@PoPD after rinsing, leading to a difference in prominence signal. The possible reason is the aggregation of several 100 nm PS spheres into a larger size aggregate that also fits into the 500 nm template.

Figure 13A:
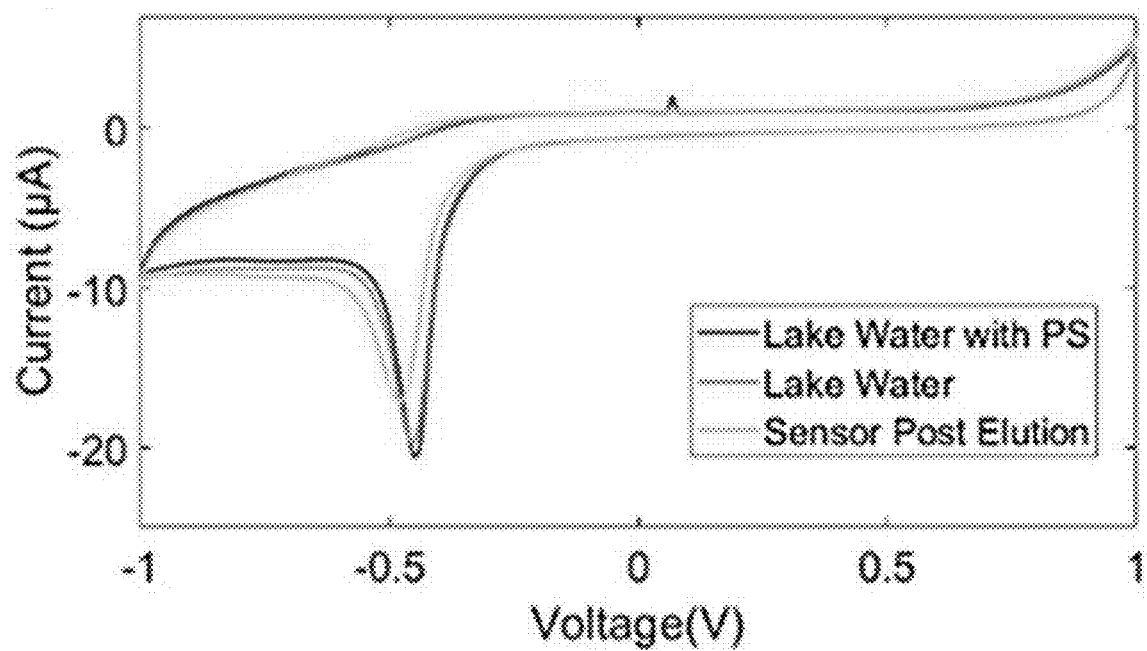
FIG. 13A is a plot illustrating the cyclic voltammetry and differential pulse voltammetry data before exposure of the sensor to lake water and lake water added with PS using PBS as the electrolyte solution, according to an embodiment of the present disclosure.
Figure 13B:
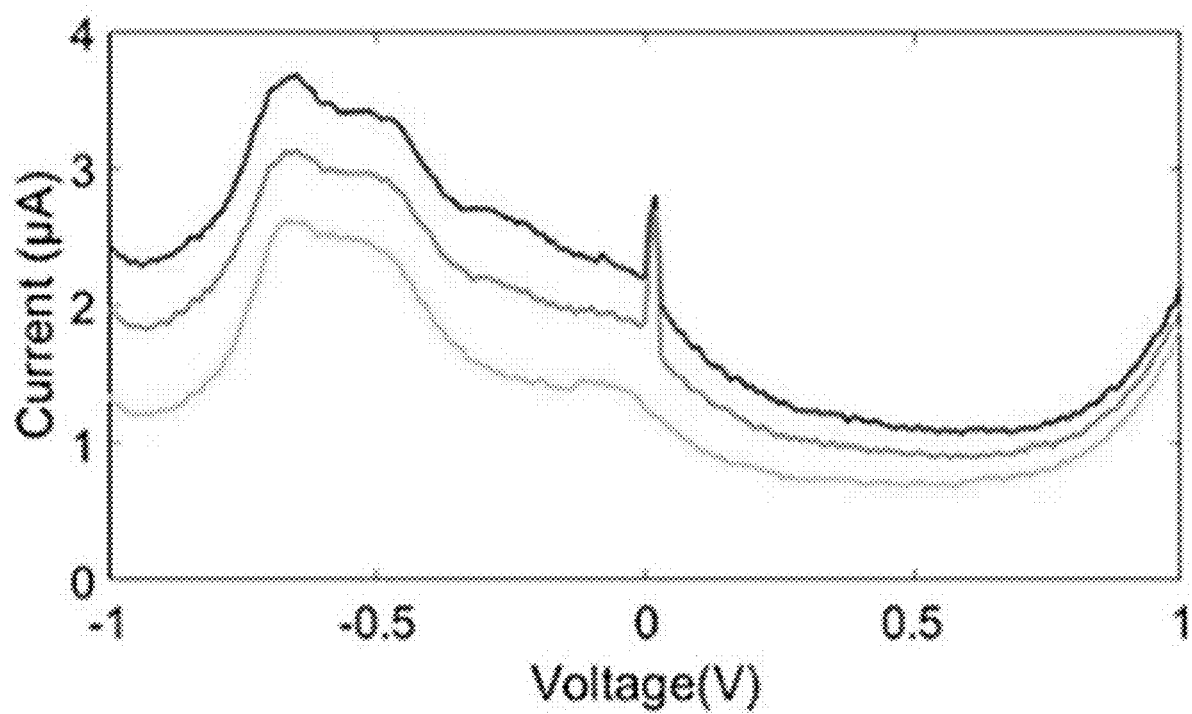
FIG. 13B is a plot illustrating the cyclic voltammetry and differential pulse voltammetry data after exposure of the sensor to lake water and lake water added with PS using PBS as the electrolyte solution, according to an embodiment of the present disclosure.
Figure 13C:
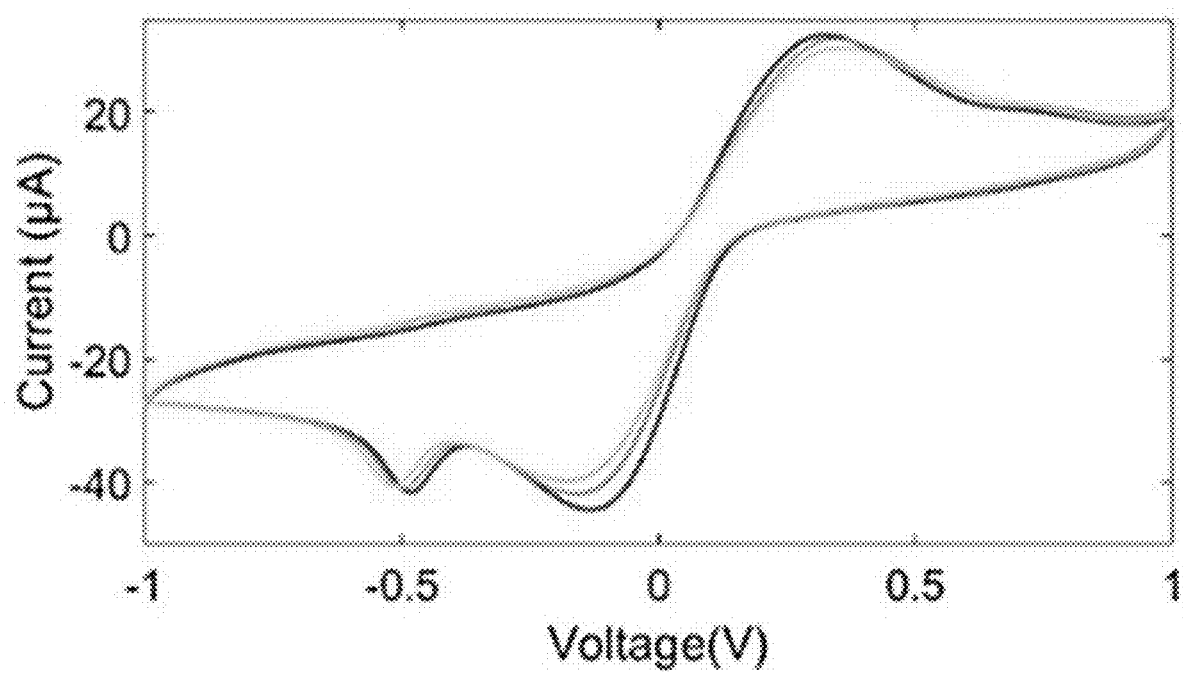
FIG. 13C is a plot illustrating the cyclic voltammetry and differential pulse voltammetry data of the sensor before exposure to lake water and lake water with added PS using Fe (ii)/Fe (III) as the electrolyte solution, according to an embodiment of the present disclosure.
Figure 13D:
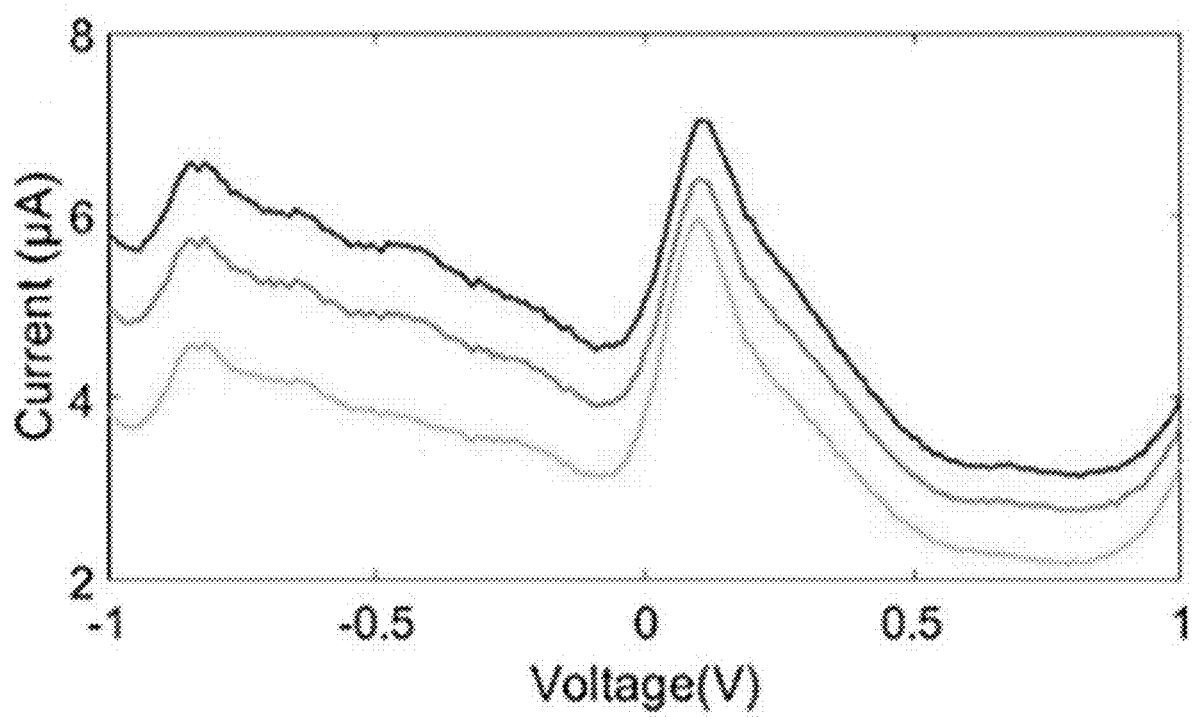
FIG. 13D is a plot illustrating the cyclic voltammetry and differential pulse voltammetry data of the sensor after exposure to lake water and lake water with added PS using Fe (ii)/Fe (III) as the electrolyte solution, according to an embodiment of the present disclosure.

The sensor was also tested using lake water from the Florida Polytechnic University campus located in Lakeland, Florida, USA. In this trial, sensors were manufactured using 100 nm templates and then tested using lake water and lake water spiked to contain $2.1 \times 10^{-4}$ g/L of 100 nm sized nPS. The sensors were tested using PBS as the electrolyte solution (See FIGS. 13A-12B), and Fe (II)/Fc (III) as the mediator (See FIG. 13C-13D), to explore the viability of mediator-free sensing. In this data, a clear increase in current can be seen throughout all the data after exposing the sensors to the lake water. This increase continues when the sensor is exposed to the spiked lake water. The distinction is clearer in the DPV data (parts b and d), where the overall current and peaks are increasing. Importantly, the prominence calculated in the DPV data for the Fe (II)/Fe (III) trial, part d, was 2.501 µA which falls very close to the expected prominence of the sensor when presented with $2.1 \times 10^{-4}$ g/L of 100 nm PS, according to the model made previously, FIGS. 9A-9B. The magnitude of the current increase in both PBS and Fe (II)/Fe (III) is nearly identical, which suggests that either solution could be used for sensing applications.

CONCLUSION

In summary, the fabrication of PoPD-based MIP for the detection of 100 and 500 nm size nPS in the artificial samples has been successfully demonstrated. The fabrication of sensors and sensing of nPS has been explored systematically using various electrochemical techniques. To support the claims, Raman spectroscopy has also confirmed the sensor fabrication and related surface changes in the development and verification of a novel, sensitive, and selective sensor for the detection of nano-scale polystyrene spheres. This sensor has proven strong and consistent results using both chronoamperometric and DPV techniques, which can be used with mobile potentiostat. These results are also consistent both with a mediator, Fe (II)/Fe (III), and mediator-free, PBS, allowing for easier transportation of any necessary chemicals for on-the-field testing.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Kaushik, A., Singh, A., Kumar Gupta, V., & Mishra, Y. K. (2024). Nano/micro-plastic, an invisible threat getting into the brain. Chemosphere, 361, 142380. https://doi.org/10.1016/j.chemosphere.2024.142380.

Noumani, A., Verma, D., Kaushik, A., Khosla, A., & Solanki, P. R. (2024). Electrochemically microplastic detection using chitosan-magnesium oxide nanosheet. Environmental Research, 252, 118894. https://doi.org/10.1016/j.envres.2024.118894.

Bermúdez, J. R., & Swarzenski, P. W. (2021). A microplastic size classification scheme aligned with Universal Plankton Survey methods. MethodsX, 8, 101516. https://doi.org/10.1016/j.mex.2021.101516.

Andrady, A. L. (2017). The plastic in Microplastics: A Review. Marine Pollution Bulletin, 119 (1), 12-22. https://doi.org/10.1016/j.marpolbul.2017.01.082.

Novotna, K., Cermakova, L., Pivokonska, L., Cajthaml, T., & Pivokonsky, M. (2019). Microplastics in drinking water treatment-current knowledge and research needs. Science of The Total Environment, 667, 730-740. https://doi.org/10.1016/j.scitotenv.2019.02.431.

Shen, M., Zeng, Z., Wen, X., Ren, X., Zeng, G., Zhang, Y., & Xiao, R. (2021). Presence of microplastics in drinking water from freshwater sources: The investigation in Changsha, China. Environmental Science and Pollution Research, 28 (31), 42313-42324. https://doi.org/10.1007/s11356-021-13769-x.

Barboza, L. G., & Gimenez, B. C. (2015). Microplastics in the marine environment: Current trends and future perspectives. Marine Pollution Bulletin, 97 (1-2), 5-12. https://doi.org/10.1016/j.marpolbul.2015.06.008.

Auta, H. S., Emenike, C. U., & Fauziah, S. H. (2017). Distribution and importance of microplastics in the Marine Environment: A review of the sources, fate, effects, and potential solutions. Environment International, 102, 165-176. https://doi.org/10.1016/j.envint.2017.02.013.

De-la-Torre, G. E. (2019). Microplastics: An emerging threat to food security and human health. Journal of Food Science and Technology, 57 (5), 1601-1608. https://doi.org/10.1007/s13197-019-04138-1.

Ragusa, A., Svelato, A., Santacroce, C., Catalano, P., Notarstefano, V., Carnevali, O., Papa, F., Rongioletti, M. C., Baiocco, F., Draghi, S., D'Amore, E., Rinaldo, D., Matta, M., & Giorgini, E. (2021). Plasticenta: First evidence of microplastics in human placenta. Environment International, 146, 106274. https://doi.org/10.1016/j.envint.2020.106274.

Schwabl, P., Köppel, S., Königshofer, P., Bucsics, T., Trauner, M., Reiberger, T., & Liebmann, B. (2019). Detection of various microplastics in human stool. Annals of Internal Medicine, 171 (7), 453-457. https://doi.org/10.7326/m19-0618.

Amato-Lourenço, L. F., Carvalho-Oliveira, R., Junior, G. R., dos Santos Galvão, L., Ando, R. A., & Mauad, T. (2021). Presence of airborne microplastics in human lung tissue. Journal of Hazardous Materials, 416, 126124. https://doi.org/10.1016/j.jhazmat.2021.126124.

13. V. L. Leonard, S., Liddle, C. R., Atherall, C. A., Chapman, E., Watkins, M., D. J. Calaminus, S., & Rotchell, J. M. (2024). Microplastics in human blood: Polymer types, concentrations and characterisation using uftir. Environment International, 188, 108751. https://doi.org/10.1016/j.envint.2024.108751.

Bordós, G., Urbányi, B., Micsinai, A., Kriszt, B., Palotai, Z., Szabó, I., Hantosi, Z., & Szoboszlay, S. (2019). Identification of microplastics in fish ponds and natural freshwater environments of the Carpathian Basin, Europe. Chemosphere, 216, 110-116. https://doi.org/10.1016/j.chemosphere.2018.10.110.

Arfin, Tanvir & Mohammad, F. & Yusof, Nor. (2014). Applications of polystyrene and its role as a base in industrial chemistry.

Fotopoulou, K. N., & Karapanagioti, H. K. (2017). Degradation of various plastics in the environment. The Handbook of Environmental Chemistry, 71-92. https://doi.org/10.1007/698_2017_11.

Quecholac-Piña, X., Hernández-Berriel, M. del, Mañón-Salas, M. del, Espinosa-Valdemar, R. M., & Vázquez-Morillas, A. (2020). Degradation of plastics under anaerobic conditions: A short review. Polymers, 12 (1), 109. https://doi.org/10.3390/polym12010109.

Carr, S. A., Liu, J., & Tesoro, A. G. (2016). Transport and fate of microplastic particles in wastewater treatment plants. Water Research, 91, 174-182. https://doi.org/10.1016/j.watres.2016.01.002.

Murphy, F., Ewins, C., Carbonnier, F., & Quinn, B. (2016). Wastewater treatment works (WWTW) as a source of microplastics in the aquatic environment. Environmental Science & Technology, 50 (11), 5800-5808. https://doi.org/10.1021/acs.est.5b05416.

Miller, M. E., Hamann, M., & Kroon, F. J. (2020). Bioaccumulation and biomagnification of microplastics in marine organisms: A review and meta-analysis of current data. PLOS ONE, 15 (10). https://doi.org/10.1371/journal.pone.0240792.

van Raamsdonk, L. W., van der Zande, M., Koelmans, A. A., Hoogenboom, R. L., Peters, R. J., Groot, M. J., Peijnenburg, A. A., & Weesepoel, Y. J. (2020). Current insights into monitoring, bioaccumulation, and potential health effects of microplastics present in the food chain. Foods, 9 (1), 72. https://doi.org/10.3390/foods9010072.

Li, J., Qu, X., Su, L., Zhang, W., Yang, D., Kolandhasamy, P., Li, D., & Shi, H. (2016). Microplastics in mussels along the coastal waters of China. Environmental Pollution, 214, 177-184. https://doi.org/10.1016/j.envpol.2016.04.012.

Neves, D., Sobral, P., Ferreira, J. L., & Pereira, T. (2015). Ingestion of microplastics by commercial fish off the Portuguese Coast. Marine Pollution Bulletin, 101 (1), 119-126. https://doi.org/10.1016/j.marpolbul.2015.11.008.

Mohamed Nor, N. H., Kooi, M., Diepens, N. J., & Koelmans, A. A. (2021). Lifetime accumulation of microplastic in children and adults. Environmental Science & Technology, 55 (8), 5084-5096. https://doi.org/10.1021/acs.est.0c07384.

Wibowo, A. T., Nugrahapraja, H., Wahyuono, R. A., Islami, I., Haekal, M. H., Fardiansyah, Y., Sugiyo, P. W., Putro, Y. K., Fauzia, F. N., Santoso, H., Götz, F., Tangahu, B. V., & Luqman, A. (2021). Microplastic contamination in the human gastrointestinal tract and daily consumables associated with an Indonesian farming community. Sustainability, 13 (22), 12840. https://doi.org/10.3390/su132212840.

Leslie, H. A., van Velzen, M. J. M., Brandsma, S. H., Vethaak, A. D., Garcia-Vallejo, J. J., & Lamoree, M. H. (2022). Discovery and quantification of plastic particle pollution in human blood. Environment International, 163, 107199. https://doi.org/10.1016/j.envint.2022.107199.

Xu, H., Dong, C., Yu, Z., Ozaki, Y., Hu, Z., Zhang, B., Yao, W., Yu, J., & Xie, Y. (2024). Detection and analysis of microplastics in tissues and blood of human cervical cancer patients. Environmental Research, 259, 119498. https://doi.org/10.1016/j.envres.2024.119498.

Forte, M., Iachetta, G., Tussellino, M., Carotenuto, R., Prisco, M., De Falco, M., Laforgia, V., & Valiante, S. (2016). Polystyrene nanoparticles internalization in human gastric adenocarcinoma cells. Toxicology in Vitro, 31, 126-136. https://doi.org/10.1016/j.tiv.2015.11.006.

Qiao, R., Sheng, C., Lu, Y., Zhang, Y., Ren, H., & Lemos, B. (2019). Microplastics induce intestinal inflammation, oxidative stress, and disorders of metabolome and microbiome in zebrafish. Science of The Total Environment, 662, 246-253. https://doi.org/10.1016/j.scitotenv.2019.01.245.

Shunji Furukuma, Nobuyoshi Fujii, In vitro cytotoxicity evaluation of plastic marine debris by colony-forming assay, 2016, Online ISSN 1882-5958, Print ISSN 1344-0667, Japanese Journal of Environmental Toxicology, https://doi.org/10.11403/jset.19.71.

Bhattacharjee, S., Ershov, D., Islam, M. A., Kämpfer, A. M., Maslowska, K. A., van der Gucht, J., Alink, G. M., Marcelis, A. T., Zuilhof, H., & Rietjens, I. M. (2014). Role of membrane disturbance and oxidative stress in the mode of action underlying the toxicity of differently charged polystyrene nanoparticles. RSC Adv., 4 (37), 19321-19330. https://doi.org/10.1039/c3ra46869k.

Zhao, H. J., Xu, J. K., Yan, Z. H., Ren, H. Q., & Zhang, Y. (2020). Microplastics enhance the developmental toxicity of synthetic phenolic antioxidants by disturbing the thyroid function and metabolism in developing zebrafish. Environment International, 140, 105750. https://doi.org/10.1016/j.envint.2020.105750.

Hou, B., Wang, F., Liu, T., & Wang, Z. (2021). Reproductive toxicity of polystyrene microplastics: In vivo experimental study on testicular toxicity in mice. Journal of Hazardous Materials, 405, 124028. https://doi.org/10.1016/j.jhazmat.2020.124028.

Huang, T., Zhang, W., Lin, T., Liu, S., Sun, Z., Liu, F., Yuan, Y., Xiang, X., Kuang, H., Yang, B., & Zhang, D. (2022). Maternal exposure to polystyrene nanoplastics during gestation and lactation induces hepatic and testicular toxicity in male mouse offspring. Food and Chemical Toxicology, 160, 112803. https://doi.org/10.1016/j.fct.2021.112803.

Hu, J., Qin, X., Zhang, J., Zhu, Y., Zeng, W., Lin, Y., & Liu, X. (2021). Polystyrene microplastics disturb maternal-fetal immune balance and cause reproductive toxicity in pregnant mice. Reproductive Toxicology, 106, 42-50. https://doi.org/10.1016/j.reprotox.2021.10.002.

Liu, Z., Zhuan, Q., Zhang, L., Meng, L., Fu, X., & Hou, Y. (2022). Polystyrene microplastics induced female reproductive toxicity in mice. Journal of Hazardous Materials, 424, 127629. https://doi.org/10.1016/j.jhazmat.2021.127629.

Wang, W., Guan, J., Feng, Y., Liu, S., Zhao, Y., Xu, Y., Xu, H., & Fu, F. (2023). Polystyrene microplastics induced ovarian toxicity in juvenile rats associated with oxidative stress and activation of the perk-eif2α-ATF4-chop signaling pathway. Toxics, 11 (3), 225. https://doi.org/10.3390/toxics11030225.

Zhang, Q., He, Y., Cheng, R., Li, Q., Qian, Z., & Lin, X. (2022). Recent advances in toxicological research and potential health impact of microplastics and nanoplastics in vivo. Environmental Science and Pollution Research, 29 (27), 40415-40448. https://doi.org/10.1007/s11356-022-19745-3.

Fei Xiong, Jinyan Liu, Kai Xu, Jiawei Huang, Daqin Wang, Fuxian Li, Shiyuan Wang, Juan Zhang, Yuepu Pu, Rongli Sun, Microplastics induce neurotoxicity in aquatic animals at environmentally realistic concentrations: A meta-analysis, Environmental Pollution, Volume 318, 2023, 120939, ISSN 0269-7491, https://doi.org/10.1016/j.envpol.2022.120939.

Xiong, F., Liu, J., Xu, K., Huang, J., Wang, D., Li, F., Wang, S., Zhang, J., Pu, Y., & Sun, R. (2023). Microplastics induce neurotoxicity in aquatic animals at environmentally realistic concentrations: A meta-analysis. Environmental Pollution, 318, 120939. https://doi.org/10.1016/j.envpol.2022.120939.

Mariano, S., Tacconi, S., Fidaleo, M., Rossi, M. & Dini, L. Micro and Nanoplastics Identification: Classic Methods and Innovative Detection Techniques. Front. Toxicol. 3, (2021).

Asamoah, B. O., Kanyathare, B., Roussey, M., & Peiponen, K. E. (2019). A prototype of a portable optical sensor for the detection of transparent and translucent microplastics in freshwater. Chemosphere, 231, 161-167. https://doi.org/10.1016/j.chemosphere.2019.05.114.

Martic, S., Tabobondung, M., Gao, S., & Lewis, T. (2022). Emerging electrochemical tools for microplastics remediation and sensing. Frontiers in Sensors, 3. https://doi.org/10.3389/fsens.2022.958633.

Amir Mohammadimehr, Angeles Ivon Rodríguez-Villarreal, Joan Antoni López Martínez, Jasmina Casals-Terré, Review: Impact of microfluidic cell and particle separation techniques on microplastic removal strategies, Journal of Agriculture and Food Research. Volume 2024, 16, 101124, ISSN 2666-1543, https://doi.org/10.1016/j.jafr.2024.101124.

Hussain, M., Kotova, K., & Lieberzeit, P. (2016). Molecularly imprinted polymer nanoparticles for formaldehyde sensing with QCM. Sensors, 16 (7), 1011. https://doi.org/10.3390/s16071011.

Cecchini, A., Raffa, V., Canfarotta, F., Signore, G., Piletsky, S., MacDonald, M. P., & Cuschieri, A. (2017). In vivo recognition of human vascular endothelial growth factor by molecularly imprinted polymers. Nano Letters, 17 (4), 2307-2312. https://doi.org/10.1021/acs.nanolett.6b05052.

Sanchez-Almirola, J., Gage, A., Lopez, R., Yapell, D., Mujawar, M., Kamat, V., & Kaushik, A. (2023). Label and bio-active free electrochemical detection of testosterone hormone using MIP-based sensing platform. Materials Science and Engineering: B, 296, 116670. https://doi.org/10.1016/j.mseb.2023.116670.

Pacheco, J. G., Rebelo, P., Cagide, F., Gonçalves, L. M., Borges, F., Rodrigues, J. A., & Delerue-Matos, C. (2019). Electrochemical sensing of the thyroid hormone thyronamine (T0AM) via molecular imprinted polymers (MIPS). Talanta, 194, 689-696. https://doi.org/10.1016/j.talanta.2018.10.090.

Pareek, S., Jain, U., Balayan, S., & Chauhan, N. (2022). Ultra-sensitive nano-molecular imprinting polymer-based electrochemical sensor for follicle-stimulating hormone (FSH) detection. Biochemical Engineering Journal, 180, 108329. https://doi.org/10.1016/j.bej.2021.108329.

Yeasmin, S., Wu, B., Liu, Y., Ullah, A., & Cheng, L. J. (2022). Nano gold-doped molecularly imprinted electrochemical sensor for rapid and ultrasensitive cortisol detection. SSRN Electronic Journal. https://doi.org/10.2139/ssrn.4033429.

Sanagi, M. M., Salleh, S., Ibrahim, W. A., Naim, A. A., Hermawan, D., Miskam, M., Hussain, I., & Aboul-Enein, H. Y. (2013). Molecularly imprinted polymer solid-phase extraction for the analysis of organophosphorus pesticides in fruit samples. Journal of Food Composition and Analysis, 32 (2), 155-161. https://doi.org/10.1016/j.jfca.2013.09.001.

Mokgadi, J., Batlokwa, S., Mosepele, K., Obuseng, V., & Torto, N. (2013). Pressurized hot water extraction coupled to molecularly imprinted polymers for simultaneous extraction and clean-up of pesticides residues in edible and medicinal plants of the Okavango Delta, Botswana. Molecular Imprinting, 1. https://doi.org/10.2478/molim-2013-0003.

Zhang, R., Guo, X., Shi, X., Sun, A., Wang, L., Xiao, T., Tang, Z., Pan, D., Li, D., & Chen, J. (2014). Highly permselective membrane surface modification by cold plasma-induced grafting polymerization of molecularly imprinted polymer for recognition of pyrethroid insecticides in fish. Analytical Chemistry, 86 (23), 11705-11713. https://doi.org/10.1021/ac503049s.

Shevchenko, K. G., Garkushina, I. S., Canfarotta, F., Piletsky, S. A., & Barlev, N. A. (2022). Nano-molecularly imprinted polymers (nanomips) as a novel approach to targeted drug delivery in nanomedicine. RSC Advances, 12 (7), 3957-3968. https://doi.org/10.1039/d1ra08385f.

Tallant, D. R., Friedmann, T. A., Missert, N. A. et al. Raman Spectroscopy of Amorphous Carbon. MRS Online Proceedings Library 498, 37-48 (1997). https://doi.org/10.1557/PROC-498-37.

Jorio, A., Dresselhaus, M., Saito, R., & Dresselhaus, G. (2013). Raman spectroscopy in graphene related systems. Wiley-VCH.

Paulraj, P., Manikandan, A., Manikandan, E., Pandian, K., Moodley, M. K., Roro, K., & Murugan, K. (2018). Solid-state synthesis of popd@agnps nanocomposites for electrochemical sensors. Journal of Nanoscience and Nanotechnology, 18 (6), 3991-3999. https://doi.org/10.1166/jnn.2018.15219.

Kniese, J., Ritschar, S., Bünger, L., Feldhaar, H., Laforsch, C., Römpp, A., & Schmidt, H. (2023). Localisation and identification of polystyrene particles in tissue sections using Raman spectroscopic imaging. NanoImpact, 30, 100465. https://doi.org/10.1016/j.impact.2023.100465.

Glossary of Claim Terms

Cavity means a recess or hollow space within the molecularly imprinted polymer layer that is precisely shaped to bind to specific microplastic or nano plastic particles, allowing for their selective capture and detection. These cavities are formed during the synthesis of the polymer matrix by using a targeted plastic as a template.

Concentration means the amount of microplastics or nanoplastics in a fluid environment, typically expressed in units such as grams per liter (g/L). The detection sensitivity of the sensor electrode is calibrated to measure concentrations ranging from about 2.1×10-92.1\times 10^{-9}2.1× 10-9 g/L to 2.1×10-42.1\times 10^{-4}2.1×10-4 g/L.

Connection interface means the physical or electronic coupling point between the sensor electrode and an external electrochemical control unit. It ensures the proper transmission of electric currents and data signals required for operation.

Detection signal means the measurable output generated by the sensor electrode based on the electrochemical response induced by the presence of microplastics or nanoplastics in a fluid environment. This signal is analyzed to determine the presence and quantity of target particles.

Differential pulse voltammetry (DPV) means an electrochemical technique that applies a series of voltage pulses to the sensor electrode and measures the resulting current to detect changes in the electrochemical response, often used for sensitive detection of microplastics.

Electrochemical control unit means a device that regulates the electronic currents applied to the sensor electrode. Examples include potentiostats, galvanostats, and cyclic voltammetry analyzers, which are essential for initiating and monitoring the sensor's detection process.

Electrostatic layer means a conductive layer applied to the surface of the sensor electrode. It is designed to attract microplastics or nanoplastics through electrostatic interactions, enhancing the efficiency of the detection process.

Elution solution means a mixture of solvents, typically water and methanol, used to remove the template plastic material from the molecularly imprinted polymer layer during sensor synthesis. This creates specific cavities for future particle binding.

Heterogeneous sensor electrodes mean electrodes within a sensor system that are specifically configured with distinct properties or functional layers to target and detect different microplastic or nano plastics. These electrodes may feature variations in molecularly imprinted polymer layers, electrostatic properties, or physical structures to enhance selectivity and accuracy in identifying specific particles from diverse environmental samples.

Mediator means a chemical or material added to the screen-printed carbon electrode to enhance the electrochemical reaction between the electrode and the microplastic or nano plastic particles. It may also include electrostatic properties for improved particle capture.

Microplastic means plastic particles with dimensions ranging from 1 μm to 1 mm. They are typically formed by the degradation of larger plastic materials and can accumulate in various environments, including water sources.

Molecularly imprinted polymer (MIP) means a synthetic polymer layer and/or matrix designed with cavities that match the shape, size, and chemical properties of specific target molecules, such as microplastics or nanoplastics, for selective detection and binding.

Nano plastic means plastic particles with dimensions in the nanoscale, typically ranging from 1 nm to 1 μm. These particles are of particular concern due to their ability to penetrate biological systems, including the blood-brain barrier.

Poly(o-phenylenediamine) (PoPD) means a specific type of polymer used in the molecularly imprinted polymer layer of the sensor electrode.

Polymerization solution means a chemical mixture used in the synthesis of the molecularly imprinted polymer layer. It includes a monomer like o-phenylenediamine and a template material representing the target plastic.

Potentiostat means an electrochemical device that maintains a constant voltage between the working and reference electrodes in the sensor system, enabling the accurate detection of target particles through current measurement.

Screen-printed carbon electrode (SPCE) means a type of electrode fabricated using screen-printing technology. It consists of a working electrode, a counter electrode, and a silver reference electrode, and serves as the substrate for the molecularly imprinted polymer layer.

Selectivity means the sensor's ability to distinguish and detect specific microplastics or nanoplastics among other particles or contaminants in a fluid environment, ensured by the tailored cavities in the molecularly imprinted polymer.

Sensitivity means the sensor system's ability to detect microplastics and nanoplastics at low concentrations, quantified by the smallest measurable change in the detection signal corresponding to the presence of target particles.

Template material means the specific microplastic or nano plastic used during the polymerization process to create cavities within the molecularly imprinted polymer layer. Common templates include polystyrene, polyethylene, and polypropylene.

Voltammogram means a graph of current versus voltage obtained during electrochemical testing. It provides data on the electrochemical properties of the sensor electrode and the presence of target particles in the fluid environment.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A sensor system for detecting micro plastics, nano plastics, or both in a fluid environment, comprising:
    a. a sensor electrode comprising:
        i. a screen-printed carbon electrode;
        ii. a molecularly imprinted polymer layer superposed onto the screen-printed carbon electrode;
        iii. wherein the molecularly imprinted polymer layer comprises a plurality of cavities disposed about the outer surface of the molecularly imprinted polymer layer; and
    b. an electrochemical control unit operably connected to the sensor electrode, wherein the electrochemical control unit is configured to transmit an electronic current into the sensor electrode; and
    c. a data output module configured to generate a detection signal based on the electrochemical response from the sensor electrode.

2. The sensor system of claim 1, wherein the electrochemical control unit is selected from a group consisting of a potentiostat, miniaturized potentiostat, ultra miniaturized potentiostat, galvanostat, cyclic voltammetry analyzer, and a combination thereof.

3. The sensor system of claim 1, wherein the electrochemical control unit is configured to output an electrochemical response of an electric current or voltage, whereby the response of the micro plastic particles, nano plastic particles, or both can be quantitatively measured.

4. The sensor system of claim 1, wherein the molecularly imprinted polymer layer is selected from a group consisting of poly(o-phenylenediamine), polyaniline, polypyrrole, poly(4-vinylpyridine), polymer nanofibers, polyurethane, and a combination thereof.

5. The sensor system of claim 1, further comprising an electronic device communicatively coupled to the electrochemical sensing device, data output module, or both.

6. The sensor system of claim 5, wherein the electronic device is configured to wirelessly operate the electrochemical sensing device, transmit the detection signal from the data output module, or both in real time.

7. The sensor system of claim 1, further comprising two or more heterogeneous sensor electrodes, wherein a first sensor electrode is configured to detect a different micro plastic, nano plastic, or both than a second sensor electrode.

8. The sensor system of claim 1, wherein the sensor electrode is configured to detect the presence of micro plastics, nano plastics, or both from a group consisting of polystyrene, polyethylene, polyvinyl, polypropylene, polycarbonate, bisphenol, acrylonitrile butadiene styrene, polymethyl methacrylate, polyamide, and a combination thereof.

9. A sensor electrode for detecting micro plastics, nano plastics, or both in a fluid environment, the sensor comprising:
    a. a screen-printed carbon electrode comprising:
        i. a working electrode;
        ii. a counter electrode; and
        iii. a silver reference electrode;
    b. a molecularly imprinted polymer layer superposed onto the working electrode;
    c. a connection interface communicatively coupled to the working electrode, wherein the connection interface is configured to operably connect to an outside electrochemical control unit and transmit an electric current across the screen-printed carbon electrode; and
    d. wherein the molecularly imprinted polymer layer comprises a plurality of cavities disposed about the outer surface of the molecularly imprinted polymer layer.

10. The sensor electrode of claim 9, wherein the plurality of cavities is configured to couple a micro plastic, nano plastic, or both about at least one portion of the outer surface of the molecularly imprinted polymer layer.

11. The sensor electrode of claim 9, wherein the molecularly imprinted polymer layer is selected from a group consisting of poly(o-phenylenediamine), polyaniline, polypyrrole, poly(4-vinylpyridine), polymer nanofibers, polyurethane, and a combination thereof.

12. The sensor electrode of claim 9, wherein the molecularly imprinted polymer layer is configured to detect the presence of micro plastics, nano plastics, or both from a group consisting of polystyrene, polyethylene, polyvinyl, polypropylene, polycarbonate, polyvinyl chloride, polyurethane, nylon, bisphenol, acrylonitrile butadiene styrene, polymethyl methacrylate, polyamide, and a combination thereof.

13. The sensor electrode of claim 9, wherein the sensor electrode is configured to detect micro plastic, nano plastic, or both with a size ranging from about 50 nm to about 800 nm.

14. The sensor electrode of claim 9, wherein the sensor electrode is configured to detect the presence of micro plastics, nano plastics, or both in concentrations in a fluid environment having micro plastics, nano plastics, or both ranging from about $2.1 \times 10^{-9}$ g/L to about $2.1 \times 10^{-4}$ g/L.

15. A method of detecting micro plastics, nano plastics, or both in a fluid environment, the method comprising:
    a. disposing a sensor electrode for detecting micro plastics, nano plastics, or both communicatively coupled to an electrochemical control unit, within the fluid environment, the sensor electrode comprising:
        i. a screen-printed carbon electrode comprising:
            a working electrode;
            a counter electrode; and
            a silver reference electrode;
        ii. a molecularly imprinted polymer layer superposed onto the working electrode;

iii. a connection interface communicatively coupled to the working electrode wherein the connection interface is configured to operably connect to an outside research device and transmit voltages across the screen-printed carbon electrode; and
iv. wherein the molecularly imprinted polymer layer comprises a plurality of cavities disposed about the outer surface of the molecularly imprinted polymer layer;
b. transmitting, via the electrochemical control unit, an electronic current into the sensor electrode, thereby inducing an electrochemical response; and
c. generating a detection signal based on the electrochemical response from the sensor electrode.

16. The method of claim 15, wherein two or more heterogeneous sensor electrodes are configured to operably connect to an electrochemical control unit to detect a micro plastic, nano plastic, or both.

17. The method of claim 16, wherein the two or more heterogeneous sensor electrodes are configured whereby wherein a first sensor electrode is configured to detect a different micro plastic, nano plastic, or both than a second sensor electrode.

18. The method of claim 15, wherein an electronic device is communicatively coupled to the electrochemical control unit whereby the electronic device is configured to input command to the electrochemical control unit to transmit an electronic current into the sensor electrode.

19. The method of claim 15, wherein the detection signal generated is the response of the sensor electrode to an electronic current selected from a group consisting of cyclic voltammetry, differential pulse voltammetry, chronoamperometry, and a combination thereof.

20. The method of claim 15, wherein the sensor electrode for detecting micro plastics, nano plastics, or both is disposed into the fluid environment for a time period of at least ten minutes.

21. The method of claim 15, further comprises the step of calculating the prominence of the detection signal wherein the prominence of the detection signal is the difference between the peak and valley of the detection signal.

22. A method for synthesizing a sensor electrode for detecting micro plastics, nano plastics, or both in a fluid environment, the method comprising:

a. disposing a screen-printed carbon electrode within a hydrochloric acid solution;
b. exposing the screen-printed carbon electrode to a polymerization solution;
c. polymerizing the screen-printed carbon electrode via an electronic current wherein a layer of molecularly imprinted polymer having a plurality of cavities disposed about an outer surface of the molecularly imprinted polymer layer is formed on the screen-printed carbon electrode; and
d. eluting the molecularly imprinted polymer matrix by suspending the screen-printed electrode in an elution solution.

23. The method of claim 22, wherein a mediator is applied onto the screen-printed carbon electrode to increase the polymerization of the screen-printed carbon electrode via increasing the electrochemical reaction between the polymerization solution and the screen-printed carbon electrode.

24. The method of claim 22, wherein the polymerization solution is comprised of 1 mM of a base polymer, 10 µl of a template material, and 15 mL of deionized water.

25. The method of claim 22, wherein the base polymer further comprises of a polymer selected from a group consisting of poly(o-phenylenediamine), polyaniline, polypyrrole, poly(4-vinylpyridine), polymer nanofibers, polyurethane, and a combination thereof.

26. The method of claim 22, wherein the template material of the polymerization solution further comprises a targeted plastic selected from a group consisting of polystyrene, polyethylene, polyvinyl, polypropylene, polycarbonate, bisphenol, acrylonitrile butadiene styrene, polymethyl methacrylate, polyamide, and a combination thereof.

27. The method of claim 22 wherein the template material of the polymerization solution further comprises of a targeted plastic having a thickness of at least 50 nm.

28. The method of claim 22, wherein the molecularly imprinted polymer matrix is suspended in the elution solution for a time period of at least thirty minutes.

29. The method of claim 22, wherein the elution solution is comprised of 50% deionized water and 50% methanol.

* * * * *